United States Patent
Matsumoto

(10) Patent No.: US 7,171,307 B2
(45) Date of Patent: Jan. 30, 2007

(54) MOBILE PORTABLE TERMINAL, COMMUNICATION HOST APPARATUS, AND WEATHER FORECASTING SYSTEM

(75) Inventor: Takenori Matsumoto, Yokohama (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 62 days.

(21) Appl. No.: 11/096,249

(22) Filed: Apr. 1, 2005

(65) Prior Publication Data

US 2005/0222771 A1   Oct. 6, 2005

(30) Foreign Application Priority Data

Apr. 6, 2004   (JP)   ............... 2004-112165

(51) Int. Cl.
*G01W 1/00*   (2006.01)
(52) U.S. Cl. ....................................... 702/3
(58) Field of Classification Search ............ 702/3, 702/4
See application file for complete search history.

(56) References Cited

U.S. PATENT DOCUMENTS

| | | | |
|---|---|---|---|
| 4,218,755 A | | 8/1980 | Root |
| 6,023,223 A | * | 2/2000 | Baxter, Jr. ............... 340/531 |
| 6,076,044 A | * | 6/2000 | Brown ..................... 702/3 |
| 6,553,336 B1 | * | 4/2003 | Johnson et al. .......... 702/188 |
| 6,590,529 B2 | | 7/2003 | Schwoegler |
| 6,862,528 B2 | * | 3/2005 | Scannell .................. 702/3 |
| 2002/0188522 A1 | * | 12/2002 | McCall et al. ............ 705/26 |
| 2003/0004780 A1 | * | 1/2003 | Smith et al. ............. 705/10 |

FOREIGN PATENT DOCUMENTS

| | | |
|---|---|---|
| JP | 2000155178 | 6/2000 |
| JP | 2001136568 | 5/2001 |
| JP | 2002044289 | 2/2002 |
| JP | 2002148061 | 5/2002 |
| JP | 3366275 | 11/2002 |

OTHER PUBLICATIONS

"NHK Weather Handbook Revised Version," Oct. 1996, Japan Broadcasting Publishing Corporation, pp. 1-2 together with English translation of related part.

* cited by examiner

*Primary Examiner*—Donald McElheny, Jr.
(74) *Attorney, Agent, or Firm*—Stevens, Davis, Miller & Mosher, LLP

(57) ABSTRACT

A mobile portable terminal may have a sensor section that measures weather information including temperature, humidity, barometric pressure, and sunshine. A first weather information storage section stores the weather information, a first threshold information storage section stores threshold information used to sift the weather information, and a first information computation section computes necessary weather information from the weather information based on the threshold information. A first weather forecast section makes a first weather forecast based on the necessary weather information, a communication section transmits the weather information and receives the threshold information, and a weather forecast output section outputs the first weather forecast.

6 Claims, 14 Drawing Sheets

MOBILE PORTABLE TERMINAL, COMMUNICATION HOST APPARATUS, AND WEATHER FORECASTING SYSTEM

BACKGROUND OF THE INVENTION

1. Field of the Invention

The present invention relates to a mobile portable terminal, communication host apparatus, and weather forecasting system, and more particularly to a mobile portable terminal that can implement weather forecasting, a communication host apparatus for causing weather forecasting to be implemented by this mobile portable terminal, and a weather forecasting system that includes a mobile portable terminal and communication host apparatus.

2. Description of the Related Art

In prior art literature 1 through 6 cited below, inventions are proposed that enable weather forecasting to be implemented using a mobile portable terminal. In literature 1 (Unexamined Japanese Patent Publication No. 2000-155178), a method is proposed whereby weather is forecast from measurement information obtained from a plurality of kinds of weather satellites, the location of a mobile portable terminal incorporating a GPS (Global Positioning System) function is identified using GPS, the weather of a localized area a short time later is forecast, and is distributed to the mobile portable terminal.

In literature 2 (Japanese Patent Publication No. 3366275), a method is proposed whereby a weather sensor is installed in a PHS channel base station, a user makes a request to a weather information center from a fixed telephone, the weather information center collects local weather information using the weather sensor installed in the base station, and provides this information to the user.

In literature 3 (Unexamined Japanese Patent Publication No. 2001-136568), literature 4 (Unexamined Japanese Patent Publication No. 2002-044289), and literature 5 (Unexamined Japanese Patent Publication No. 2002-148061), methods are proposed whereby a mobile communication network is used, weather sensors are installed in mobile portable terminals, and information obtained by these weather sensors is collected and used for weather forecasting.

Details of a method whereby weather forecasting is performed based on obtained weather information (temperature, humidity, barometric pressure, sunshine, precipitation, cloud formation, wind speed, and wind direction) are given in literature 6 (NHK Broadcasting Culture Research Institute, "NHK Weather Handbook Revised Version," October 1996, Japan Broadcasting Publishing Corporation).

Using a mobile communication network, installing weather sensors in mobile portable terminals, collection information obtained by the weather sensors, and performing weather prediction using that information to predict the weather is an effective method for making a weather forecast for a short period of no more than several hours (hereinafter referred to as a "nowcast"). Since sudden rain is a serious problem for street vendors and companies involved in organizing outdoor events, for example, and sudden localized torrential rain may cause major damage, accurate nowcasts are vitally important. However, accurate nowcasts are often very difficult to achieve, as explained below.

At present, nowcasts made by the Meteorological Office are within a range of one to six hours or so. For example, a current precipitation nowcast predicts the hourly amount of precipitation up to six hours in advance. For nowcasts, a method is used in which two methods—a numerical forecasting model and running extrapolated prediction—are combined after deciding on their respective weightings.

In a numerical forecasting model, a meso-value forecasting model is used that makes a meso-scale phenomenon forecast for several hours in which the horizontal scale is in a range of several tens of kilometers to several hundred kilometers or so. A meso-value forecasting model actually uses weather information automatically observed in a regional weather observation system in which one location is set up in an approximately 20 km square area (hereinafter referred to by its popular name "AMEDAS"). Running extrapolated prediction predicts the amount of rainfall several hours later from the amount of rainfall of a 2.5 km square area found from the radar AMEDAS analysis amount of rainfall.

AMEDAS information used in a numerical forecasting model is for one location in a 20 km square area, and information for a smaller region than this cannot be observed. Also, for the radar AMEDAS analysis amount of rainfall used in running extrapolated prediction, the amount of rainfall in a 2.5 km square area is found, but since the measured value is affected by the terrain and so forth, accuracy is poorer than for the AMEDAS amount of rainfall.

Thus, in actuality, radar AMEDAS analysis rainfall and AMEDAS rainfall are used in a numerical forecasting model while being compared and corrected. Also, while a prediction after a time elapse can be found by extrapolation of estimated values, the amount of precipitation that occurs from the initial time onward cannot be predicted.

In nowcasts, since time and space scales are often small and meteorological phenomena fluctuate violently, and weather information for a range smaller than the AMEDAS range cannot be observed accurately, in many cases weather forecasts cannot be made accurately. For these reasons, in particular, it is currently difficult to make a weather forecast for an extremely short period, such as within an hour, for example.

In a radio mobile communication system, the cell radius of a base station is in a range of several hundred meters to several kilometers, and in the case of a cell radius of several kilometers, a single cell is often divided into a plurality of sectors. That is to say, a radio mobile communication system can collect weather information for areas smaller than the installation zones of AMEDAS.

If GPS, which is expected to become increasingly widespread in the future, is installed in a mobile portable terminal, more precise positioning is made possible. That is to say, if a weather sensor is installed in each mobile portable terminal, a mobile communication network is used, and weather sensor information is collected, weather information for much smaller areas than with AMEDAS can be collected at short time intervals, and it possible to make accurate nowcasts.

However, in the case of the inventions disclosed in above-mentioned literature 1 through 5, concretized contents for collecting weather information and performing nowcasts are not described in practical terms, and as of now these inventions have not been put into actual use. In order to collect weather information and implement nowcasts, it is necessary to solve the following kinds of problems.

The first problem is that, when weather information is collected by a mobile portable terminal, fewer kinds of weather information can be acquired. Normally, it is necessary for weather information used for weather forecasting to include barometric pressure, temperature, wind direction, wind speed, precipitation, humidity, duration of sunshine, amount of solar radiation, cloud formation, and so forth, and these items of weather information are observed automatically by means of measuring devices. On the other hand, when small size and low cost are taken into consideration, weather sensors that can actually be installed in a mobile portable terminal are probably weather sensors capable of measuring temperature, humidity, barometric pressure, and sunshine, and such sensors cannot, of course, measure weather information other than temperature, humidity, barometric pressure, and sunshine—that is to say, wind direction, wind speed, precipitation, and cloud formation.

The second problem is that the reliability of weather information observed by weather sensors installed in a mobile portable terminal is lower than that of weather information observed by means of AMEDAS. A mobile portable terminal is required to be small and low-priced, and it is difficult to include expensive, high-precision weather sensors. Moreover, observations by weather sensors may be made under various conditions, such as when a mobile portable terminal is inside a bag or case, when a mobile portable terminal is left in an air-conditioned room, and when a mobile portable terminal is carried on the person and is affected by body temperature. It will probably continue to be difficult to incorporate expensive, high-precision weather sensors in mobile portable terminals in the future, and an important consideration is how accurate the weather information collected by the weather sensors can be made—that is, how efficiently weather information that is not necessary for weather forecasting can be eliminated from the collected weather information.

The third problem is that it is difficult to transmit large quantities of weather information data using a mobile portable terminal. In a normal mobile communication network, packet communication is used for non-voice communication, and a billing system is used in which charges depend on the amount of information transmitted and received. Taking factors such as reducing communication charges and decreasing communication traffic into consideration, it is desirable for the amount of measured weather information data transmitted to be kept as small as possible.

If the frequency of communication of a mobile portable terminal is reduced and the communication time interval is increased, both communication charges and communication traffic can be reduced. With AMEDAS, weather observations are made once every 10 minutes. However, in mobile communications, making weather observations once every 10 minutes and transmitting weather information regularly each time represents a comparatively high frequency of transmission. Also, as described above, transmitting weather information regularly at short time intervals is necessary in order to make accurate weather forecasts at short intervals for a small area.

The fourth problem is that it is difficult to execute complex computational processing and large-volume information processing based on weather information in a mobile portable terminal. Although mobile portable terminals have achieved major advances in terms of functionality and processing performance, there is still a strong demand for lighter weight and lower power consumption. It is desirable for a mobile portable terminal to execute simple computational processing and small-volume information processing based on weather information.

The fifth problem, specific to mobile communications, is that the location of a mobile portable terminal changes frequently. For example, to consider a case where the user of a mobile portable terminal receives weather information in that mobile portable terminal while moving at high speed, it is necessary to consider how to provide accurate weather information in the area in which the user is currently located.

SUMMARY OF THE INVENTION

It is an object of the present invention to provide a mobile portable terminal, communication host apparatus, and weather forecasting system whereby the functional loads of a mobile portable terminal and a communication host apparatus equipped with a host computer can be assigned appropriately, weather forecasting can be performed accurately, and communication traffic can be reduced, and furthermore complex processing in a mobile portable terminal can be decreased, and a user can be provided with a highly convenient weather forecasting service.

According to an aspect of the invention, a mobile portable terminal is provided that includes a sensor section that measures weather information comprising any one or a plurality of temperature, humidity, barometric pressure, and/or sunshine, a first weather information storage section that stores the weather information, a first threshold information storage section that stores threshold information used to sift the weather information, a first information computation section that computes necessary weather information from the weather information based on the threshold information, a first weather forecast section that makes a first weather forecast based on the necessary weather information, a communication section that transmits the weather information and receives the threshold information, a weather forecast output section that outputs the first weather forecast, and a first information control section that controls the sensor section, first weather information storage section, first threshold information storage section, first information computation section, first weather forecast section, communication section, and weather forecast output section.

According to another aspect of the invention, a communication host apparatus is provided that includes an information storage section, a host computer, and a network interface, and in which the information storage section has a second weather information storage section that stores weather information transmitted from a mobile portable terminal, a second threshold information storage section that stores threshold information used to sift the weather information, an extra-terminal weather information database section that stores extra-terminal weather information other than the aforementioned weather information, and a terminal information storage section that stores at least location information of the mobile portable terminal; the host computer has a second information computation section that computes the threshold information based on the weather information and extra-terminal weather information, and a second information control section that controls the second weather information storage section, second threshold information storage section, extra-terminal weather information database section, terminal information storage section, second information computation section, and network interface; and the network interface has a transmission/reception function that at least receives the weather information and transmits the threshold information.

According to still another aspect of the invention, a weather forecasting system is provided that has a mobile portable terminal that includes a sensor section that measures weather information comprising any one or a plurality of temperature, humidity, barometric pressure, and/or sunshine, a first weather information storage section that stores the weather information, a first threshold information storage section that stores threshold information used to sift the weather information, a first information computation section that computes necessary weather information from the weather information based on the threshold information, a first weather forecast section that makes a first weather forecast based on the necessary weather information, a communication section that transmits the weather information and receives the threshold information, a weather forecast output section that outputs the first weather forecast, and a first information control section that controls the sensor section, first weather information storage section, first threshold information storage section, first information computation section, first weather forecast section, communication section, and weather forecast output section; and a communication host apparatus that includes an information storage section, a host computer, and a network interface, and in which the information storage section has a second weather information storage section that stores weather information transmitted from a mobile portable terminal, a second threshold information storage section that stores threshold information used to sift the weather information, an extra-terminal weather information database section that stores extra-terminal weather information other than the aforementioned weather information, and a terminal information storage section that stores at least location information of the mobile portable terminal, the host computer has a second information computation section that computes the threshold information based on the weather information and extra-terminal weather information, and a second information control section that controls the second weather information storage section, second threshold information storage section, extra-terminal weather information database section, terminal information storage section, second information computation section, and network interface, and the network interface has a transmission/reception function that at least receives the weather information and transmits the threshold information.

BRIEF DESCRIPTION OF THE DRAWINGS

The above and other objects and features of the invention will appear more fully hereinafter from a consideration of the following description taken in conjunction with the accompanying drawing wherein one example is illustrated by way of example, in which.

DESCRIPTION OF THE PREFERRED EMBODIMENTS

The gist of the present invention is that, in a weather forecasting system, the functions necessary for weather forecasting are mainly incorporated in a mobile portable terminal, and complex computational functions required for generating threshold values, coefficients, and so forth, necessary for weather forecasting are incorporated in a communication host apparatus.

A feature of a weather forecasting system according to an embodiment of the present invention is that weather forecasting by a mobile portable terminal can be executed based on weather information collected in an area much smaller than an area in which current AMEDAS weather information is collected. A further feature of the weather forecasting system is that information such as weather information can be transmitted and received interactively—that is, bidirectionally—between a mobile portable terminal and a communication host apparatus.

The ability to transmit and receive information interactively between a mobile portable terminal and communication host apparatus enables tasks necessary for weather forecasting to be distributed appropriately between a mobile portable terminal and communication host apparatus. Specifically, a mobile portable terminal makes use of its mobility to collect weather information, and transmits this weather information to the communication host apparatus, while the communication host apparatus collects weather information from a plurality of mobile portable terminals, performs computations necessary for weather forecasting on these items of information, and transmits the computation results to the mobile portable terminals. The mobile portable terminals then perform weather forecasting based on the computation results transmitted from the communication host apparatus.

By sharing functions appropriately in this way so that the function of storing enormous amounts of weather information and other information and the function of performing complex and cumbersome computational processing are executed in a communication host apparatus, a mobile portable terminal can perform weather forecasting while storing a small amount of information and executing simple computational processing. Moreover, interactive capability enables weather information distribution services, weather information acquisition and distribution services, services offering a better weather prediction success rate, and so forth, to be provided from a communication host apparatus to a mobile portable terminal—that is, from a provider to a user. Authentication services can also be offered that improve security when transmitting and receiving information.

With reference now to the accompanying drawings, embodiments of the present invention will be explained in detail below.

(Embodiment 1)

[Configuration of Weather Forecasting System]

Figure 2:
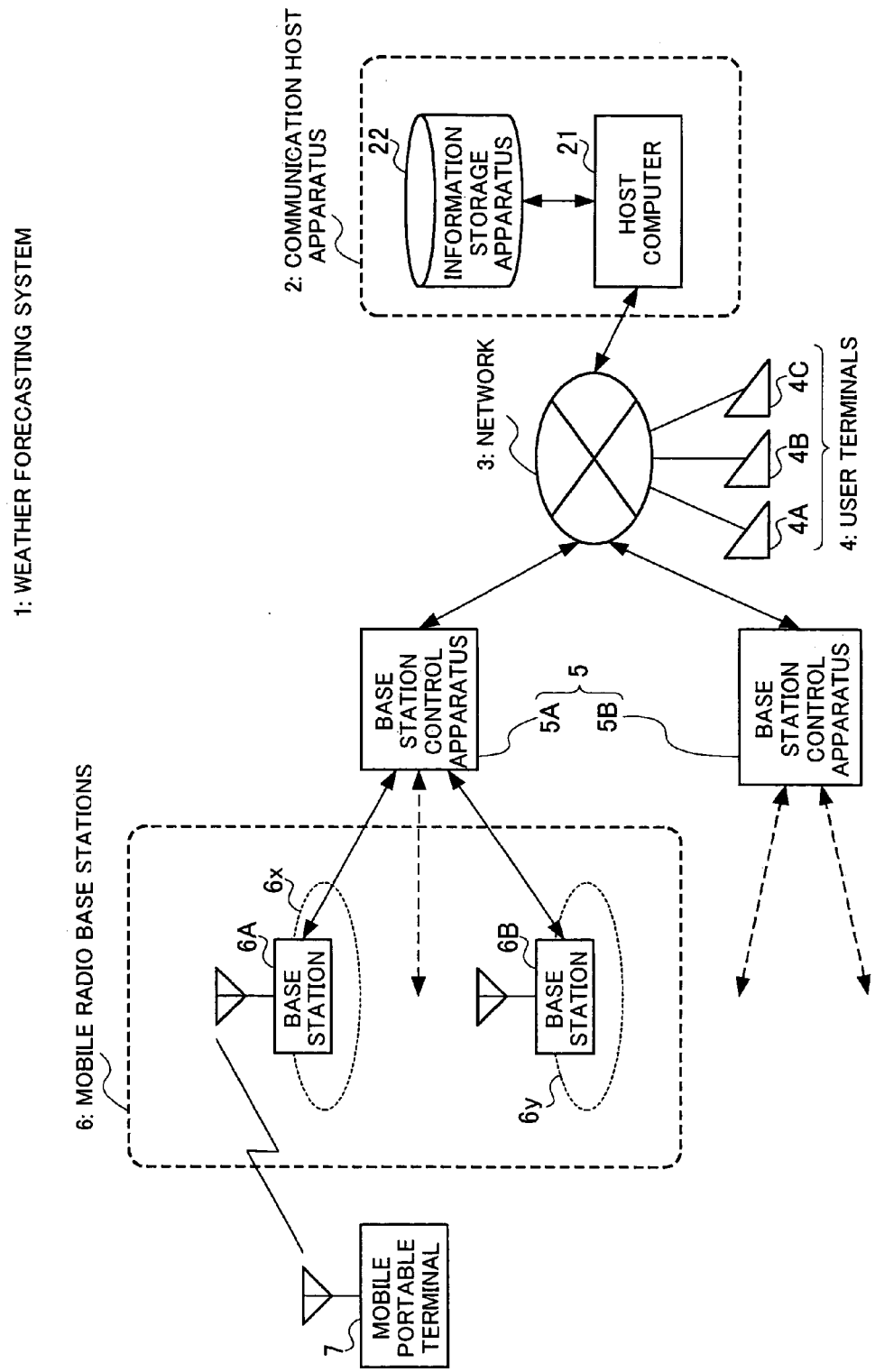
FIG. 2 is a schematic configuration diagram of a weather forecasting system according to Embodiment 1 of the present invention.

In view of the societal impact of weather forecasts, weather forecasting operations are restricted by law to specific persons such as Meteorological Office employees and certified weather forecasters. As shown in FIG. 2, a weather forecasting system 1 according to Embodiment 1 of the present invention that implements weather forecast provision services within these limitations includes a communication host apparatus 2 comprising a host computer 21 and information storage apparatus 22, user terminals 4 (4A through 4C) connected to host computer 21 of communication host apparatus 2 via channels (a network) 3, base station control apparatuses 5 (5A through 5C) connected to network 3, mobile radio base stations 6 connected to a base station control apparatus, and mobile portable terminals 7 that perform common transmission and reception to/from mobile radio base stations 6. In Embodiment 1, network 3 comprises mainly wire circuits. The meaning of wire circuits here includes wire circuits incorporating a microwave, satellite, or other relay system. For mobile radio base stations 6, the dotted line around base station 6A represents cell range 6x, and the dotted line around base station 6B represents cell range 6y.

Here, handling of user terminals 4 is restricted to specific persons. These specific persons are users with specialized knowledge relating to weather forecasting such as Meteorological Office employees and certified weather forecasters, as mentioned above. These users access communication host apparatus 2 from user terminals 4 via network 3, and, as described later herein, can, for example, change the weather forecasting computation method—specifically, the forecast coefficient computation method and the like in communication host apparatus 2. Such computation method changes are important in improving the accuracy of weather forecasts. Also, users can use user terminals 4 to acquire various kinds of weather forecasting related information from communication host apparatus 2 via network 3. Users can perform original weather forecasting based on this acquired weather information and so forth, and implement weather forecast provision services. User terminals 4 may be personal computers, for example.

A mobile portable terminal 7 may be a mobile phone, radio communication device, personal computer (in particular, a portable notebook personal computer), Personal Digital Assistant (PDA), or the like, that can be handled by the general public rather than only the specific persons described above.

In Embodiment 1, user terminals 4 (4A through 4C), base station control apparatuses 5 (5A and 5B), and mobile portable terminals 7 are not limited to the numbers shown in FIG. 2.

[Configuration of Mobile Portable Terminal]

Figure 1:
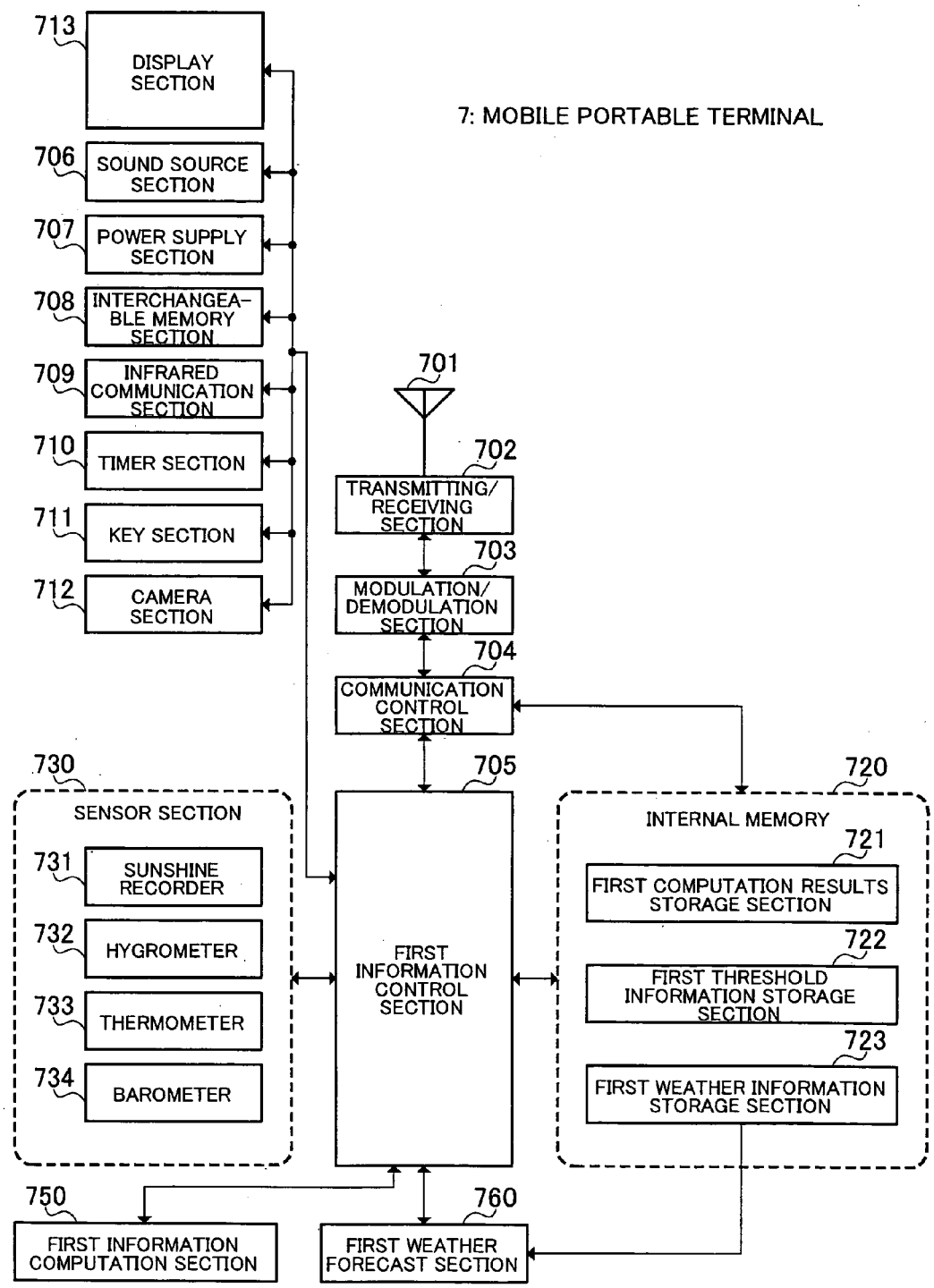
FIG. 1 is a block diagram showing the configuration of a mobile portable terminal of a weather forecasting system according to Embodiment 1 of the present invention.

Next, the configuration of mobile portable terminal 7 according to Embodiment 1 shown in FIG. 2 will be described. First, as shown in FIG. 1, mobile portable terminal 7 according to Embodiment 1 is provided with a basic configuration for implementing communication, comprising an antenna 701, transmitting/receiving section 702, modulation/demodulation section 703, communication control section 704, and first information control section 705.

Antenna 701 transmits and receives radio signals. Transmitting/receiving section 702 performs reception and transmission of radio band radio signals. Modulation/demodulation section 703 modulates or demodulates transmit/receive signals. Communication control section 704 performs control for implementing radio communication, including error detection and error correction for performing radio communication correctly, transmit/receive timing, assessing the strength of a signal to a mobile radio base station 6, and so forth. First information control section 705 independently performs control of application software and hardware unrelated to radio communication.

Communication control section 704 and first information control section 705 are both constructed using one or a plurality of CPUs (central processing units) or DSPs (digital signal processors), or a combination of a CPU and DSP. Internal memory 720 in which an operating system (OS) and application software are stored, and various kinds of hardware, are connected to first information control section 705.

For internal memory 720, a configuration is used whereby the memory functions connected to both communication control section 704 and first information control section 705 are shared, but independent configurations may be used for communication control section 704 and first information control section 705 respectively. Internal memory 720 comprises one or a plurality of memory devices according to the information write speed, read speed, storage capacity, and so forth. The detailed block configuration of internal memory 720 will be described later herein.

The various kinds of hardware connected to first information control section 705 include a sound source section 706, a power supply section 707, an interchangeable memory (volatile memory) section 708, an infrared communication section 709, a timer section 710, a key (input) section 711, a camera section 712, and a display section 713. Display section 713 outputs visible information such as text, graphics, and symbols, and a user can receive this visible information. Sound source section 706 outputs audible or tactile information such as an alarm, music, speech, and vibrations, and a user can receive this audible or tactile information.

Mobile portable terminal 7 according to Embodiment 1 is also provided with a sensor section 730, a first computation results storage section 721, a first threshold information storage section 722, a first weather information storage section 723, a first information computation section 750, and a first weather forecast section 760, necessary for weather forecasting.

Sensor section 730 is basically equipped with functions for measuring weather information, and includes a sunshine recorder 731 that measures sunshine, a hygrometer 732 that measures humidity, a thermometer 733 that measures air temperature, and a barometer 734 that measures barometric pressure. The sensors (weather sensors) in sensor section 730 can collect the minimum weather information necessary for making a weather forecast. Limiting the sensors used to these enables mobile portable terminal 7 to be made small and achieve low power consumption. While sensor section 730 according to Embodiment 1 is equipped with four sensors (731 through 734) as described above, it is not absolutely essential for all these sensors to be included, and one sensor, two sensors, or three sensors may be provided. Here, sunshine recorder 731 is not restricted to simply a weather sensor that measures only the amount of solar radiation, but includes a weather sensor that enables the amount of solar radiation to be measured periodically and the duration of sunshine to be calculated.

In Embodiment 1, first computation results storage section 721, first threshold information storage section 722, and first weather information storage section 723 are constructed in internal memory 720. First weather information storage section 723 can store weather information measured by sensor section 730 at fixed time intervals and for a fixed time period. First threshold information storage section 722 can store threshold information for performing sifting of necessary weather information and unnecessary weather information among weather information measured by sensor section 730. First computation results storage section 721 can store necessary weather information for which computation results have been extracted.

First information computation section 750 can execute various kinds of computations, and in particular at least computations to extract (sift) necessary weather information based on weather information stored in first weather information storage section 723 and threshold information stored in first threshold information storage section 722. First weather forecast section 760 can perform weather forecasting based on weather information stored in first computation results storage section 721.

First information control section 705 controls various kinds of hardware, and in particular can perform transmission/reception control of weather forecast related communication signals (weather forecast information) to/from host computer 21 of communication host apparatus 2.

Mobile portable terminal 7 is equipped with a sensor section 730, and has weather information collection by means of this sensor section 730 added as a major function. This weather information collection itself can be executed with very little information processing capability compared with the computational processing associated with weather forecasting. Furthermore, mobile portable terminal 7 is equipped with a first information computation section 750 and first weather forecast section 760 by means of which weather forecasting is performed within a range that does not require much information processing capability as compared with the information processing capability of communication host apparatus 2.

[Configuration of Communication Host Apparatus]

Figure 3:
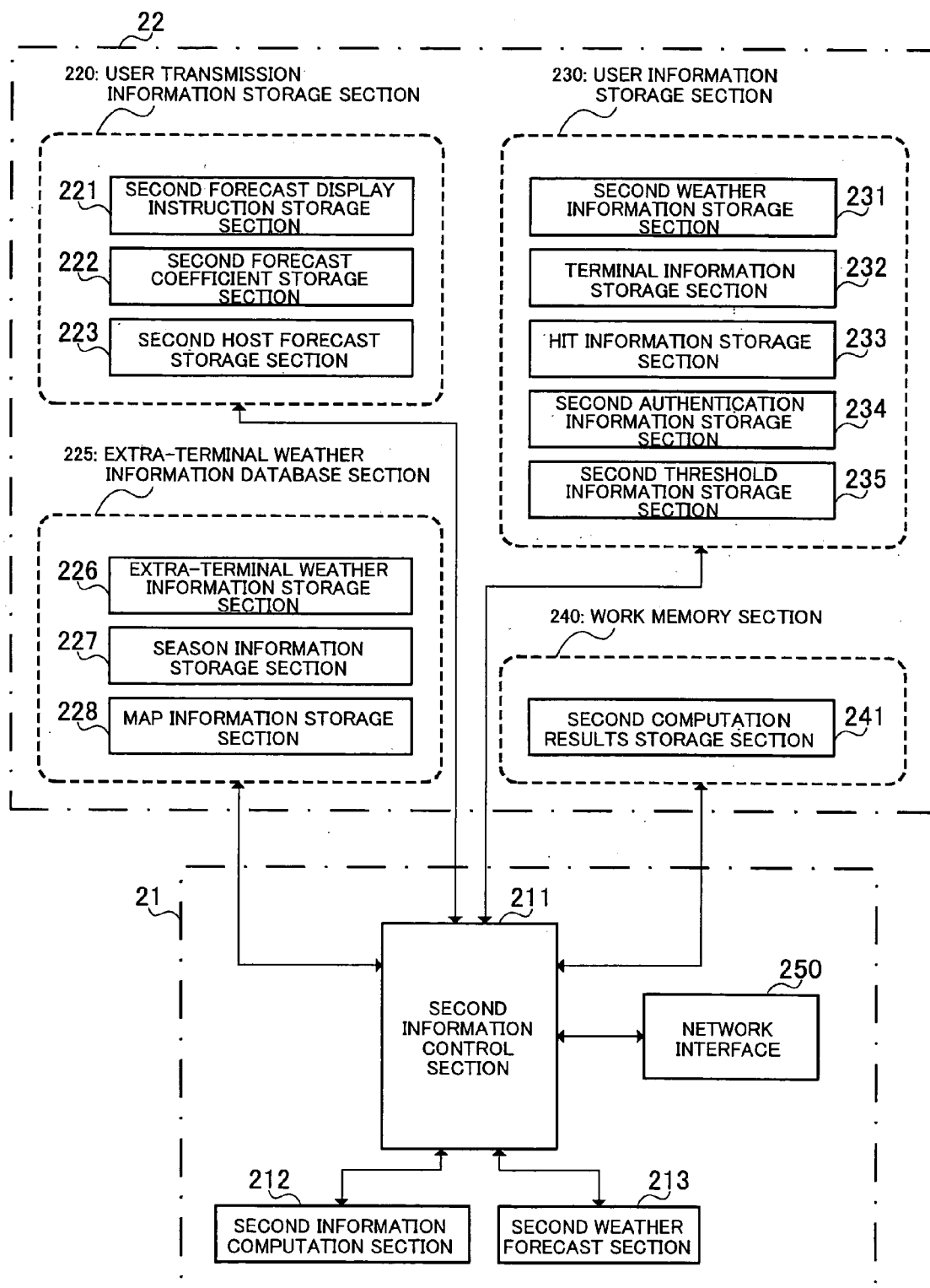
FIG. 3 is a block diagram showing the configuration of a communication host apparatus according to Embodiment 1 of the present invention.

Next, the configuration of communication host apparatus 2 according to Embodiment 1 shown in FIG. 3 will be described. As shown in FIG. 3, communication host apparatus 2 according to Embodiment 1 is provided with a network interface 250 in addition to the aforementioned host computer 21 and information storage apparatus 22. Network interface 250 is an interface that connects network 3 shown in FIG. 2 with this communication host apparatus 2.

Host computer 21 is composed of a second information control section 211, a second information computation section 212, and a second weather forecast section 213.

Information storage apparatus 22 comprises a user transmission information storage section 220, an extra-terminal weather information database section 225, a user information storage section 230, and a work memory section 240. User transmission information storage section 220 is provided with a second forecast display instruction storage section 221, a second forecast coefficient storage section 222, and a second host forecast storage section 223. Extra-terminal weather information database section 225 is provided with an extra-terminal weather information storage section 226, a season information storage section 227, and a map information storage section 228. User information storage section 230 is provided with a second weather information storage section 231, a terminal information storage section 232, a hit information storage section 233, a second authentication information storage section 234, and a second threshold information storage section 235. Work memory section 240 comprises a second computation results storage section 241.

Communication host apparatus 2 can be constructed as a fixed facility provided with far higher information processing capability than mobile portable terminal 7, and therefore second information computation section 212 and second weather forecast section 213 can perform processing necessary for weather forecasting that requires information processing capability.

[Operation of Weather Forecasting System]

The operation of the weather forecasting system will now be explained, with the operation of mobile portable terminal 7 described using FIG. 4, and the operation of communication host apparatus 2 described using FIG. 5.

Operation of Mobile Portable Terminal 7

First, the operation of mobile portable terminal 7 will be described. As shown in step S1, weather information is acquired using sensor section 730, and this acquired weather information is stored in first weather information storage section 723 of internal memory 720. As chronological elements of weather information are necessary for weather forecasting, weather information storage is performed at fixed time intervals and for a fixed time period.

As weather information varies according to whether mobile portable terminal 7 is indoors, outdoors, affected by the user's body temperature, and so forth, it is necessary to separate necessary weather information from unnecessary weather information. As shown in step S2, when threshold information for performing weather information sifting (separation or sorting) is transmitted from communication host apparatus 2, the threshold information is stored in first threshold information storage section 722 of mobile portable terminal 7.

As shown in step S3, first information control section 705 determines whether or not threshold information is stored in first threshold information storage section 722. If threshold information is not stored in first threshold information storage section 722, or if threshold information is stored but is not threshold information appropriate to the region in which mobile portable terminal 7 is currently located, a request is made to communication host apparatus 2 to transmit threshold information as shown in step S9. After this threshold information transmission request has been executed, this processing ends.

If threshold information is determined to be stored in first threshold information storage section 722 in step S3, the weather information stored in first weather information storage section 723 and the threshold information stored in first threshold information storage section 722 are compared by first information computation section 750 as shown in step S4. Then, in step S5, it is determined by first information computation section 750 whether or not the threshold value has been exceeded. If the threshold has been exceeded, in Embodiment 1 this means that the weather information is unnecessary weather information, and it is determined whether or not all the weather information is unnecessary weather information as shown in step S10. If all the weather information is unnecessary weather information, this processing ends. If all the weather information is not unnecessary weather information, the unnecessary part of the weather information is discarded as shown in step S11, and the remaining necessary weather information is used later for weather forecasting. Here, a simple numeric value range may be used for a threshold, or a threshold may be set based on a reference value such as an average value and variation (deviation) from that value.

If the threshold is determined not to have been exceeded in step S5, this means that the weather information is necessary weather information, and weather forecasting is performed by first weather forecast section 760 based on this weather information as shown in step S6. Also, in step S11, weather forecasting is performed by first weather forecast section 760 based on remaining necessary weather information. The results of this weather forecasting are output to the user as visible information on display section 713 of mobile portable terminal 7 as shown in step S7.

Then, as shown in step S8, necessary weather information, or remaining necessary weather information that has not been discarded, is transmitted to communication host apparatus 2 from antenna 701 via communication control section 704, modulation/demodulation section 703, and transmitting/receiving section 702. After transmission of this weather information, this processing ends.

Operation of Communication Host Apparatus 2

Next, the operation of communication host apparatus 2 will be described. First, as shown in step S21, in information storage apparatus 22 of communication host apparatus 2, if AMEDAS or other weather information stored in extra-terminal weather information storage section 226 of extra-terminal weather information database section 225, season information stored in season information storage section 227, or map information stored in map information storage section 228 needs to be updated, that information is updated.

As shown in step S22, weather information and mobile portable terminal 7 information stored in first weather information storage section 723 of internal memory 720 on mobile portable terminal 7 is acquired. This acquired weather information is stored in second weather information storage section 231 of user information storage section 230. Mobile portable terminal 7 information is stored in terminal information storage section 232. Mobile portable terminal 7 information includes location information, weather information transmission time information, and so forth.

As shown in above-described FIG. 2, if radio communication is implemented between mobile portable terminal 7 and mobile radio base stations 6, cell range 6x or 6y in which mobile portable terminal 7 is present can be identified, and therefore mobile portable terminal 7 location information can be acquired easily and cheaply. For example, if radio communication is performed between mobile portable terminal 7 and base station 6A, mobile portable terminal 7 can be confirmed to be located within cell range 6x.

GPS enables high-precision location information to be obtained for location information specified by cell range 6x or 6y. However, the kind of high-precision location information specified by GPS is not required in weather forecasting. Commercially available mobile portable terminals 7 include models in which GPS is incorporated as standard, and in this case location information necessary for weather forecasting may be acquired by making effective use of GPS.

As shown in step S23, weather information statistical processing is performed on a fixed regional unit basis based on weather information stored in second weather information storage section 231. This statistical processing is performed by second information computation section 212. Here, a fixed regional unit is a small area determined by communication host apparatus 2, and to be specific, is one cell range 6x of base station 6A or cell range 6y of base station 6B, a plurality of cell ranges 6x and 6y, the range of a municipality, or the like, meaning a unit area such that the precision of a nowcast will not degrade significantly.

As shown in step S24, it is determined whether or not weather information in a fixed regional unit constitutes dispersion within a set value X range set beforehand. Set value X is a threshold value for determining whether or not temperature and humidity weather information dispersion due to the influence of the ambient environment of mobile portable terminal 7, such as whether or not there is influence from human body temperature, whether or not air conditioning, either heating or cooling, is operating, and so forth, constitutes accurate weather information after taking account of season information—specifically, temperature and humidity appropriate to the season—stored in season information storage section 227. If weather information constitutes dispersion outside the set value X range, it is discarded as unnecessary weather information as shown in step S28. Discarding of unnecessary weather information in line with this decision is performed by second information computation section 212.

If weather information constitutes dispersion within the set value X range, then, as shown in step S25, height (altitude) information for the relevant area is calculated based on mobile portable terminal 7 location information stored in terminal information storage section 232 and map information stored in map information storage section 228. Since barometric pressure normally decreases as altitude increases, the standard barometric pressure of the relevant area can be calculated.

As shown in step S26, based on the calculated altitude information and barometric pressure information of the weather information stored in second weather information storage section 231, it is determined whether or not this weather information constitutes dispersion within a preset set value Y range. If the weather information constitutes dispersion outside the set value Y range—that is, if the barometric pressure is clearly divergent from the barometric pressure of the relevant area—it is discarded as unnecessary weather information as shown in step S29. Discarding of unnecessary weather information in line with this decision is performed by second information computation section 212.

Similarly, if weather information of the date and time acquired is clearly different in value with respect to season information based on season information stored in season information storage section 227, weather information acquisition date and time information stored in terminal information storage section 232, and weather information stored in second weather information storage section 231, it is discarded as unnecessary weather information.

When the above-described map information and season information are taken into consideration, AMEDAS information for the relevant area or its vicinity stored in extra-terminal weather information storage section 226 is also taken into consideration. For example, if "rain" currently applies to the relevant area, lower barometric pressure may be indicated than the barometric pressure of the relevant area found simply from map information. In such a case, if general weather conditions based on AMEDAS information are taken into consideration instead of determining whether the weather information is necessary or unnecessary based on map information and season information, unnecessary weather information can be discarded with a high degree of precision and necessary information can be used for weather forecasting with a high degree of precision.

By means of the processing up to this point, communication host apparatus 2 can obtain threshold information as to the accuracy or otherwise of weather information within a certain range of dispersion for the weather information forecasting factors necessary for weather forecasting. Then, as shown in step S27, it is determined whether or not there is a transmission request for threshold information described in step S9 shown in above-described FIG. 4 in communication host apparatus 2 from mobile portable terminal 7 shown in FIG. 1. If there is no threshold information transmission request, this processing ends. If there is a threshold information transmission request, communication host apparatus 2 transmits threshold information to mobile portable terminal 7 as shown in step S30. After transmission of this threshold information, this processing ends.

Thus, according to Embodiment 1, in weather forecasting system 1, functions necessary for weather forecasting are distributed between mobile portable terminal 7 and communication host apparatus 2. As a result, communication host apparatus 2 can store weather information collected from a plurality of mobile portable terminals 7 that would be difficult for a single mobile portable terminal 7 to possess, perform statistical processing based on this weather information, compute threshold information indicating approximately what range of weather information is valid or otherwise using the results of this processing, AMEDAS or other extra-terminal weather information, season information, and map information, and transmit this threshold information to mobile portable terminal 7. On the other hand, mobile portable terminal 7 performs the simple processing of collecting weather information by means of sensor section 730, and can also correctly discard unnecessary weather information from among collected weather information based on threshold information transmitted from communication host apparatus 2, and perform accurate weather forecasting based on necessary weather information. The amount of necessary weather information is small, and therefore the amount of information processing can be reduced, and information processing time can be shortened.

(Embodiment 2)

For a mobile portable terminal, communication host apparatus, and weather forecasting system according to Embodiment 2 of the present invention, an example in which weather forecasting is performed using forecasting coefficients, and an example in which weather forecast correctness/incorrectness hit information is used to correct forecasting coefficients and perform weather forecasting, are described.

[Configuration of Mobile Portable Terminal]

Figure 6:
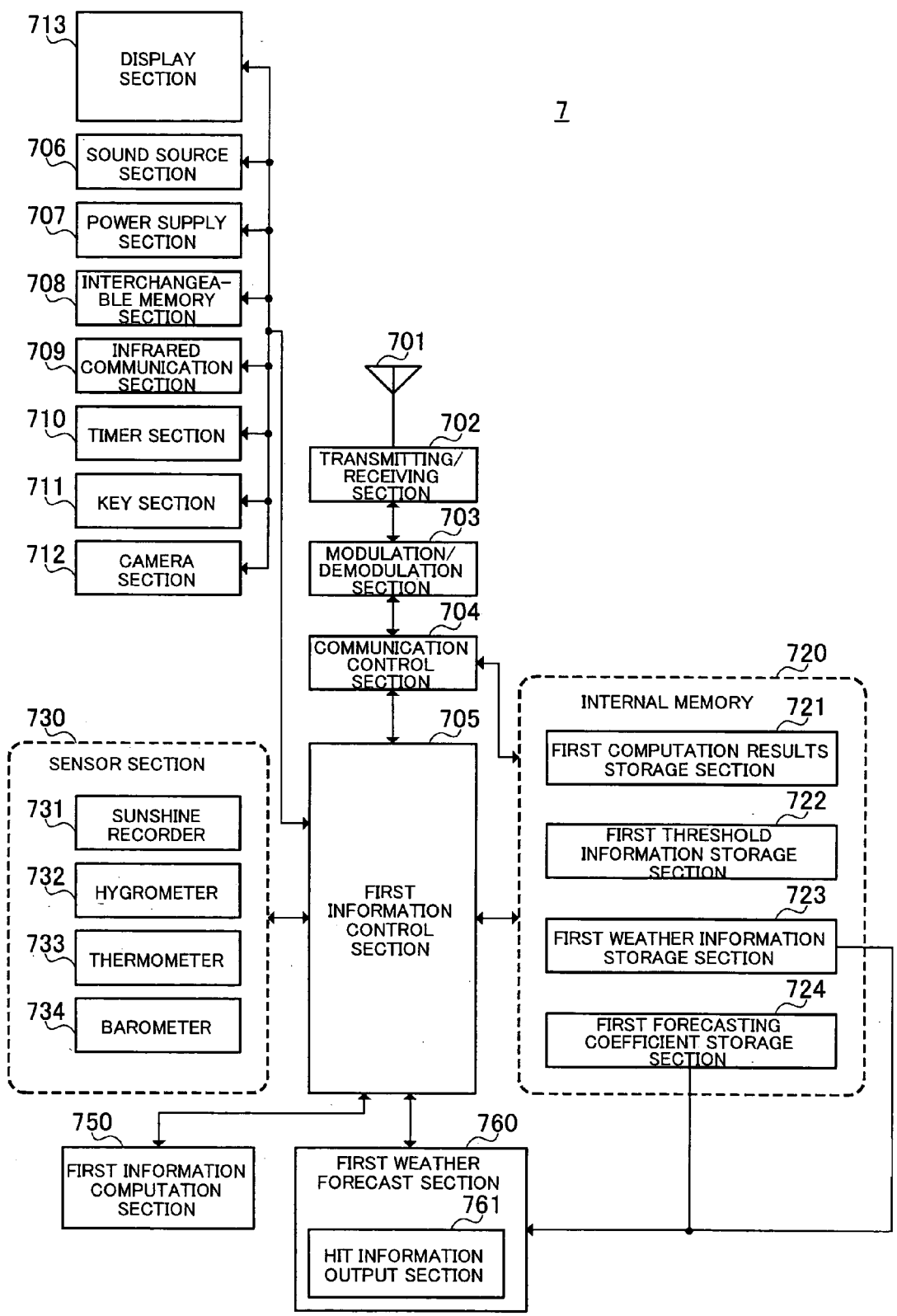
FIG. 6 is a block diagram showing the configuration of a mobile portable terminal of a weather forecasting system according to Embodiment 2 of the present invention.

A mobile portable terminal 7 according to Embodiment 2 basically has a similar configuration to mobile portable terminal 7 according to Embodiment 1, but is further provided with a first forecasting coefficient storage section 724 in internal memory 720 as shown in FIG. 6.

Here, methods of finding meteorological weather elements such as temperature and precipitation from the prediction results of a numerical forecasting model can be broadly categorized as MOS and PPM methods. The MOS method is a method whereby a statistical relational expression is created from a past numerical forecast predicted value and an observed value, and a weather element is forecast from a numerical forecast predicted value. The MOS method employs computational methods such as a linear multiple regression Kalman filter or a neural network using a nonlinear function. The PPM method is a method whereby a statistical relational expression is created between the initial value of each weather element, instead of the predicted value of the MOS method, and an observed value for the corresponding time, and is classed as a linear multiple regression expression. While the two methods handle predicted values differently, a common point is that a predicted value is multiplied by a coefficient of some kind. The calculation and comparison of such coefficients requires a large amount of computation.

Thus, coefficient calculation and comparison is performed by communication host apparatus 2, and the resulting coefficient (forecasting coefficient) is stored in first forecasting coefficient storage section 724 provided in internal memory 720 of mobile portable terminal 7. Mobile portable terminal 7 can perform weather forecasting using forecasting coefficients stored in this first forecasting coefficient storage section 724.

Also, mobile portable terminal 7 is provided with a hit information output section 761 in first weather forecast section 760. This hit information output section 761 has a function that enables a mobile portable terminal 7 user to transmit hit information to communication host apparatus 2 arbitrarily by means of a key section 711 operation. Here, hit information is information indicating correctness/incorrectness—whether a weather forecast by mobile portable terminal 7 was a hit or not a hit—and is used as information for correcting forecasting coefficients of a weather forecast for the relevant area.

[Configuration of Communication Host Apparatus]

A communication host apparatus 2 according to Embodiment 2 is basically similar to above-described communication host apparatus 2 according to Embodiment 1 shown in FIG. 3. In Embodiment 2, communication host apparatus 2 requires second forecast display instruction storage section 221, second forecast coefficient storage section 222, and second host forecast storage section 223 provided in user transmission information storage section 220.

[Operation of Weather Forecasting System]

The operation of the weather forecasting system will now be explained, with the operation of mobile portable terminal 7 described using FIG. 7, and the operation of communication host apparatus 2 described using FIG. 8.

Operation of Mobile Portable Terminal 7

Figure 4:
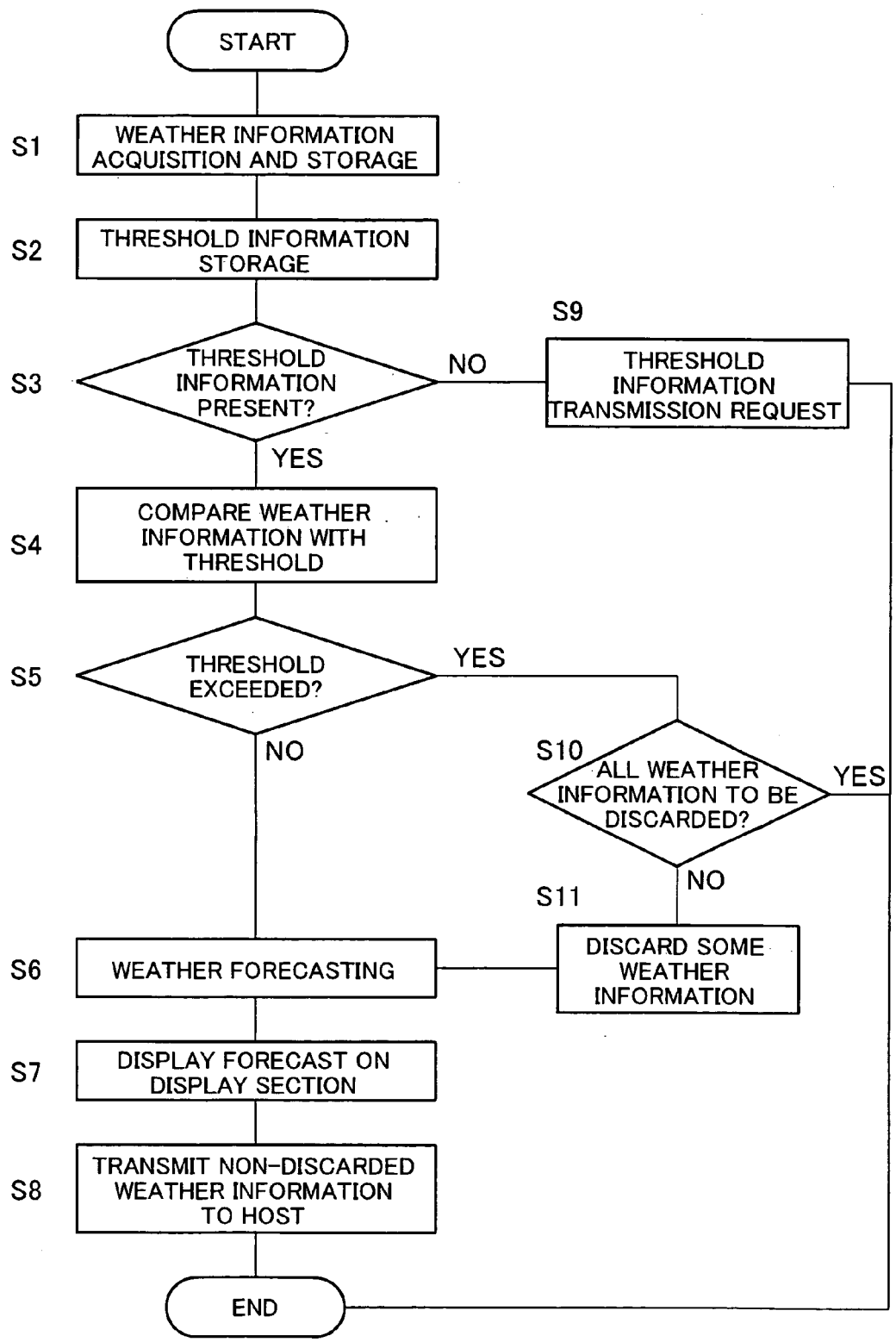
FIG. 4 is a flowchart explaining the operation of the mobile portable terminal shown in FIG. 1.
Figure 5:
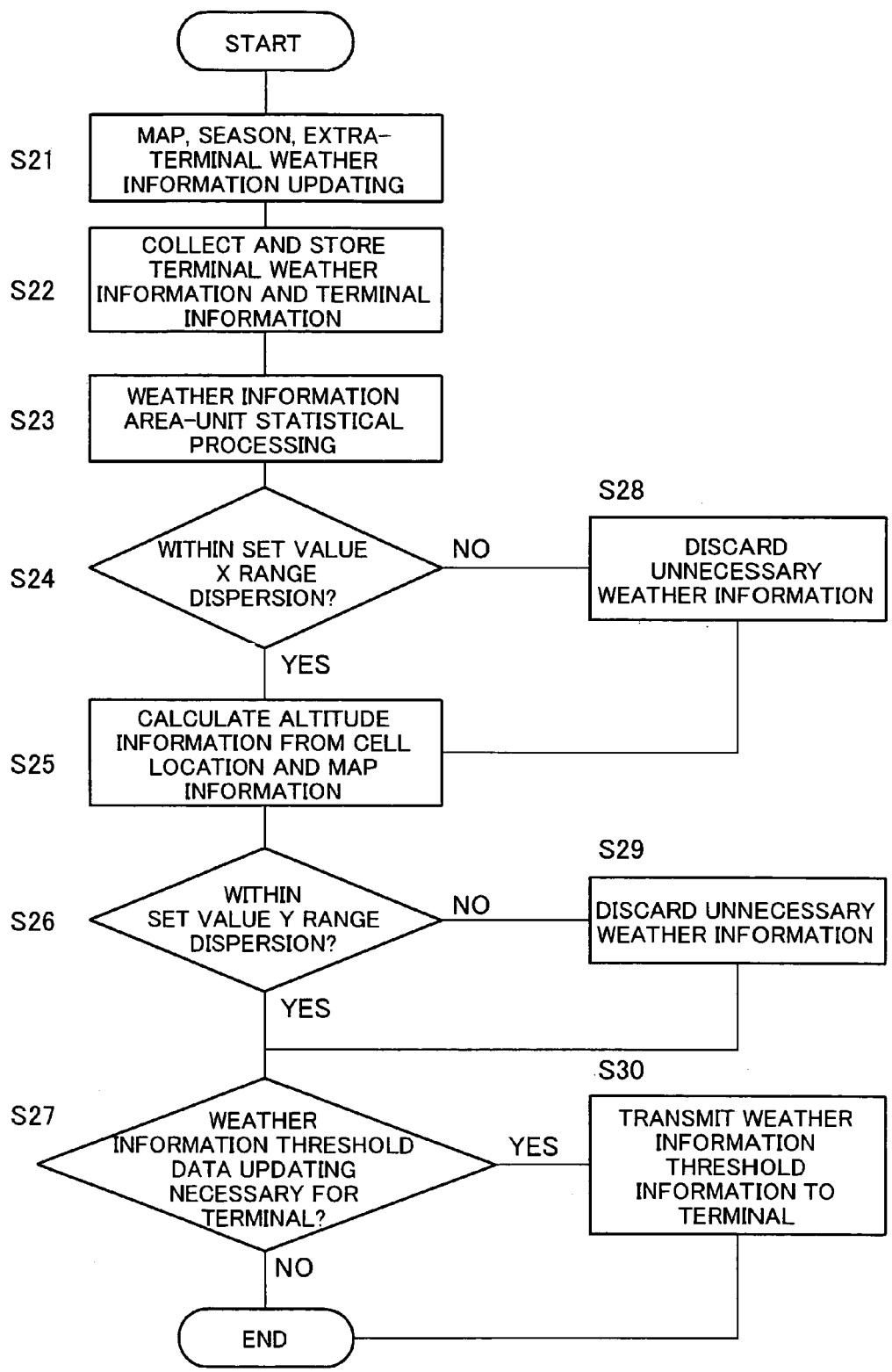
FIG. 5 is a flowchart explaining the operation of the communication host apparatus shown in FIG. 3.
Figure 7:
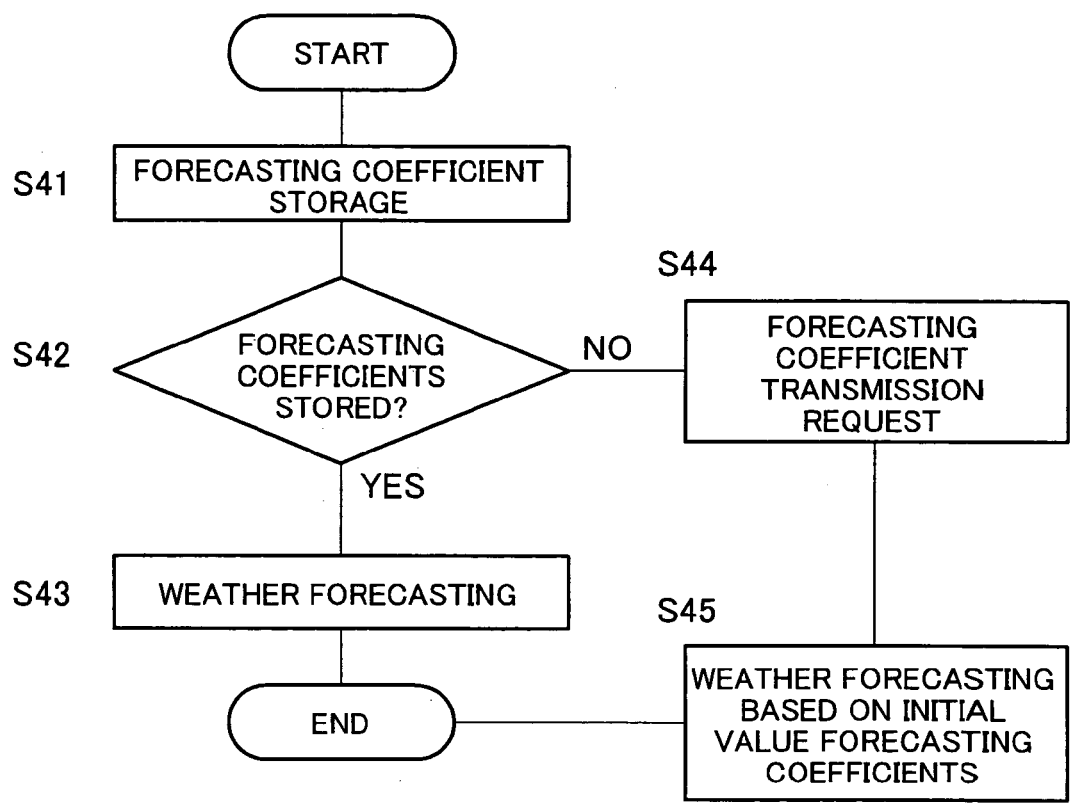
FIG. 7 is a flowchart explaining the operation of the mobile portable terminal shown in FIG. 6.
Figure 8:
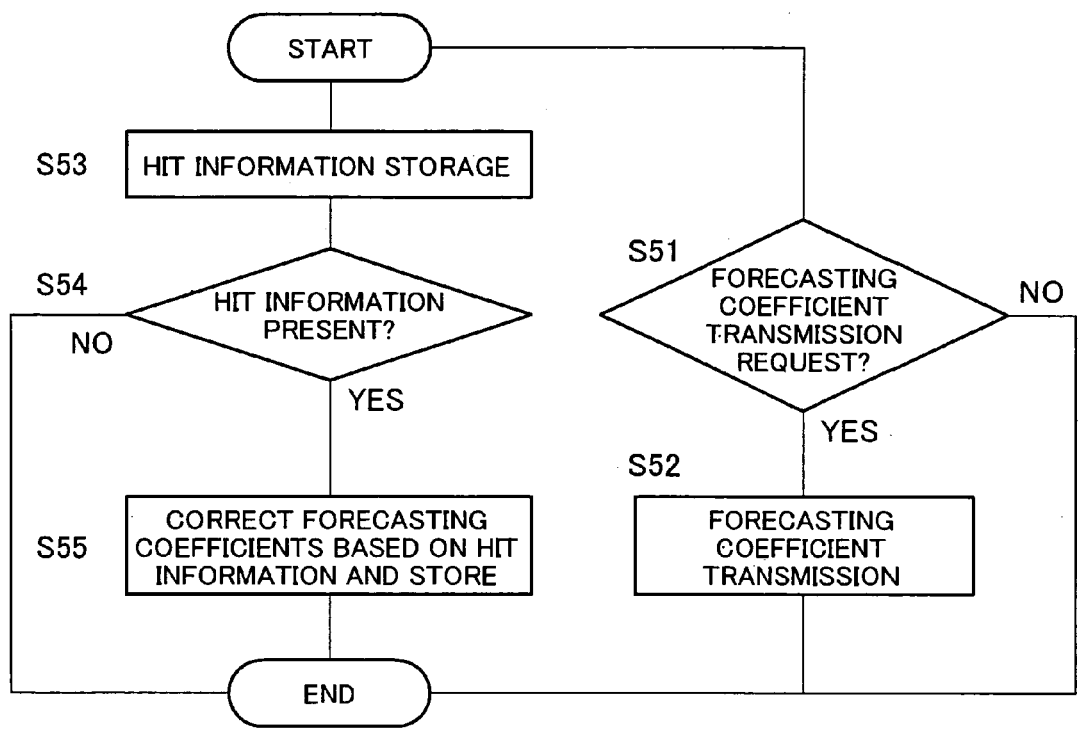
FIG. 8 is a flowchart explaining the operation of a communication host apparatus of a weather forecasting system according to Embodiment 2 of the present invention.

In the operations for implementing weather forecasting by mobile portable terminal 7 according to Embodiment 2, the stage in which weather forecasting is performed in step S6 shown in FIG. 4 in the case of mobile portable terminal 7 according to above-described Embodiment 1 is replaced by the mobile portable terminal 7 flowchart shown in FIG. 7.

That is to say, first, as shown in step S41, if a forecasting coefficient is transmitted from communication host apparatus 2, mobile portable terminal 7 stores the forecasting coefficient in first forecasting coefficient storage section 724 of internal memory 720.

As shown in step S42, mobile portable terminal 7 determines whether or not a forecasting coefficient is stored in first forecasting coefficient storage section 724. If a forecasting coefficient is stored, weather forecasting is performed based on the stored forecasting coefficient as shown in step S43. After completion of weather forecasting, this processing ends.

On the other hand, if a forecasting coefficient is not stored in first forecasting coefficient storage section 724, a forecasting coefficient transmission request is made to communication host apparatus 2 as shown in step S44. After this transmission request is made, the initial value of a forecasting coefficient stored beforehand in first forecasting coefficient storage section 724 of mobile portable terminal 7 is used, and weather forecasting is performed by mobile portable terminal 7 as shown in step S45. After completion of this weather forecasting, this processing ends.

If, in the determination shown in step S41 as to whether or not a forecasting coefficient is stored, mobile portable terminal 7 is moving at high speed or is in the process of handover between cell ranges, if a forecasting coefficient is not for the area in which mobile portable terminal 7 is currently located, and so forth, even if a forecasting coefficient is stored in first forecasting coefficient storage section 724, if this stored forecasting coefficient cannot be used it is determined that no forecasting coefficient is stored, and the forecasting coefficient transmission request shown in step S44 is made.

Operation of Communication Host Apparatus 2

Communication host apparatus 2 according to Embodiment 2 performs constant monitoring as to whether or not there is a forecasting coefficient transmission request from mobile portable terminal 7. If there is a forecasting coefficient transmission request, communication host apparatus 2 transmits a forecasting coefficient to mobile portable terminal 7 as shown in step S52. It is desirable for the operation of monitoring whether or not there is a forecasting coefficient transmission request to be performed constantly for the purpose of reducing power consumption. After forecasting coefficient transmission, this processing ends. If there is no forecasting coefficient transmission request from mobile portable terminal 7, on the other hand, this processing ends.

On the other hand, if hit information is transmitted arbitrarily from mobile portable terminal 7 as shown in step S53, communication host apparatus 2 stores the hit information in hit information storage section 233. Hit information is stored in a form that enables identification of the area in which mobile portable terminal 7 is located and the time at which the hit information was transmitted.

As shown in step S54, communication host apparatus 2 determines whether or not hit information is stored in hit information storage section 233. If hit information is stored, an issuance-time forecasting coefficient of the area for which hit information was issued is corrected as shown in step S55, and the corrected forecasting coefficient is stored in second forecast coefficient storage section 222. After storage of the corrected forecasting coefficient, this processing ends. If no hit information is stored, this processing ends.

In normal weather forecasting, also, verification of forecast precision is carried out for weather forecast results, and feedback is performed in order to improve forecast precision. For the same purpose, in communication host apparatus 2, since the benefit of collecting weather information for a small area using mobile portable terminal 7 cannot be achieved if forecasting coefficients are found across the board over a wide range, forecasting coefficients are set and stored for individual fixed small areas demarcated based on a cell range 6$x$ or 6$y$, a plurality of cell ranges 6$x$ and 6$y$, a municipality, or the like, weather forecasting is performed by mobile portable terminal 7 using these forecasting coefficients, and forecasting coefficients are corrected based on hit information transmitted arbitrarily from mobile portable terminal 7, enabling accurate weather forecasting to be achieved.

Furthermore, in mobile portable terminal 7, forecasting coefficients transmitted from communication host apparatus 2 are stored in first forecasting coefficient storage section 724 of internal memory 720, and accurate weather forecasting can be achieved by means of simple processing based on these stored forecasting coefficients.

(Embodiment 3)

For a mobile portable terminal, communication host apparatus, and weather forecasting system according to Embodiment 3 of the present invention, an example is described in which security functions can be improved while improving convenience when reporting weather forecast results to a user by means of a mobile portable terminal 7.

[Configuration of Mobile Portable Terminal]

Figure 9:
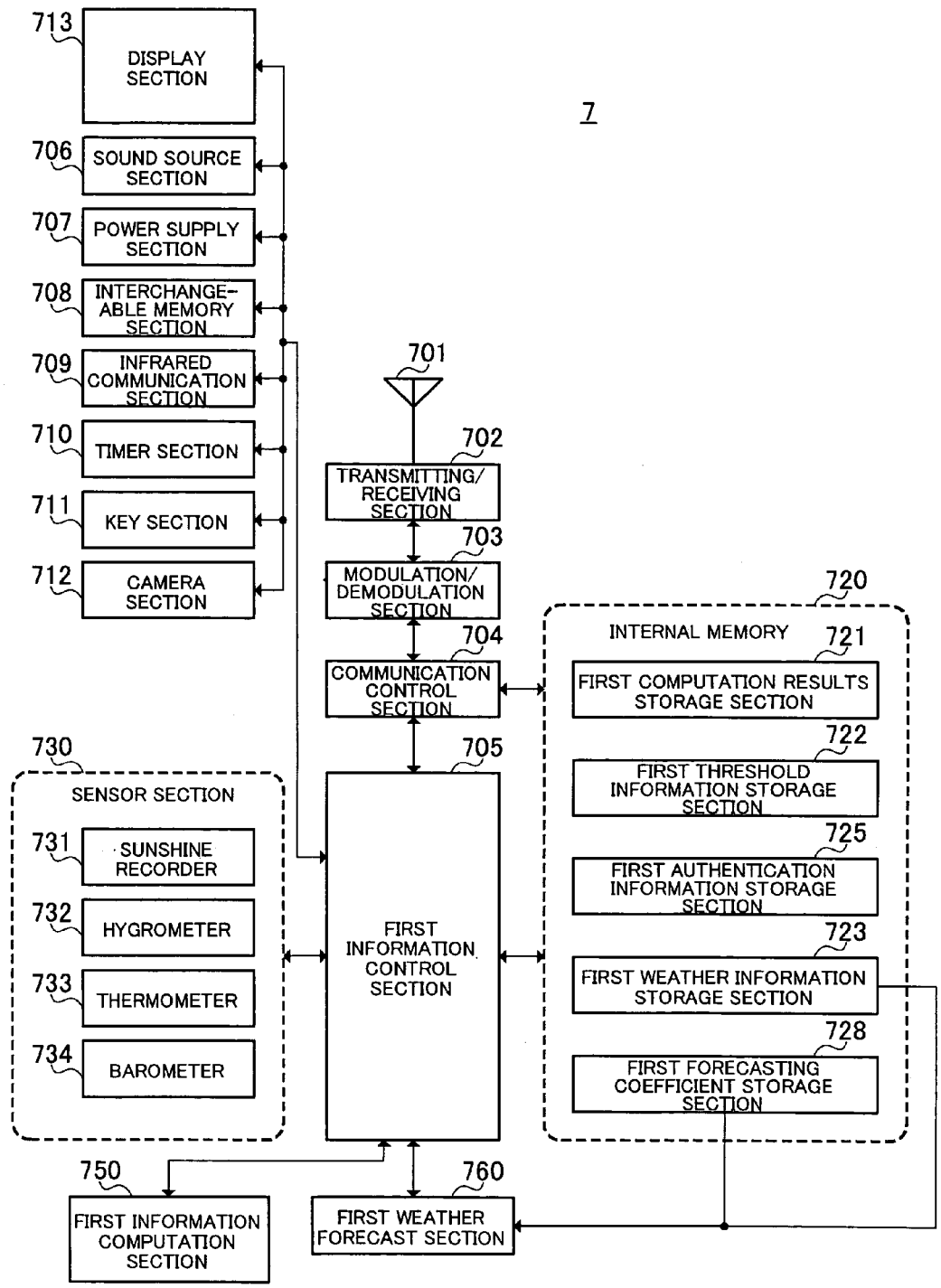
FIG. 9 is a block diagram showing the configuration of a mobile portable terminal of a weather forecasting system according to Embodiment 3 of the present invention.

A mobile portable terminal 7 according to Embodiment 3 basically has a similar configuration to mobile portable terminal 7 according to Embodiment 2, but is provided with a first authentication information storage section 725 in internal memory 720 as shown in FIG. 9.

Normally, weather forecast results are displayed on display section 713 of mobile portable terminal 7. In practice, a liquid crystal display panel or organic electroluminescence panel, for example, can be used for display section 713. A weather forecast user is not necessarily always able to view display section 713. On the other hand, if a user wants a nowcast, the user wants to know the weather forecast results as soon as they are output.

Thus, a mobile portable terminal 7 according to Embodiment 3 is provided with a function that reports a precipitation forecast to the user as a weather forecast after the elapse of a fixed time period when weather forecasting is performed.

[Configuration of Communication Host Apparatus]

A communication host apparatus 2 according to Embodiment 3 is basically similar to above-described communication host apparatus 2 according to Embodiment 1 shown in FIG. 3. In Embodiment 3, communication host apparatus 2 requires second authentication information storage section 234 provided in user information storage section 230.

[Operation of Weather Forecasting System]

The operation of the weather forecasting system will now be explained, with the operation of mobile portable terminal 7 described using FIG. 10, and the operation of communication host apparatus 2 described using FIG. 11.

Operation of Mobile Portable Terminal 7

In the operation of mobile portable terminal 7 according to Embodiment 3, the user first operates key section 711 of mobile portable terminal 7, and when mobile portable terminal 7 authentication registration has been performed, this authentication information is stored in first authentication information storage section 725 of internal memory 720 of mobile portable terminal 7 as shown in step S61.

As shown in step S62, it is determined as a weather forecast whether or not rain is imminent, for example. If the result of weather forecasting performed by first weather forecast section 760 of mobile portable terminal 7 is that it is going to rain soon, then, as shown in step S63, first information control section 705 issues to sound source section 706 an instruction to output audible information indicating that it is going to rain soon, and sound source section 706 issues audible information such as an alarm or speech based on this instruction. Mobile portable terminal 7 is also equipped with a vibration function, and information to the effect that it is going to rain soon may be output using this vibration function, either alone or together with an alarm or speech. Here, in Embodiment 3, notification to a user by means of vibration using the vibration function us included in tactile information. When a weather forecast is made to the effect that it is not going to rain soon, audible/tactile information output is not performed.

As shown in step S64, it is determined whether or not the user has performed mobile portable terminal 7 authentication registration in first authentication information storage section 725. If authentication registration has been performed, non-discarded weather information is transmitted to communication host apparatus 2 as shown in step S65. After transmission of this weather information, this processing ends. If authentication registration has not been performed, on the other hand, this processing ends.

Operation of Communication Host Apparatus 2

Next, the operation of communication host apparatus 2 will be described, including a description of security functions when transmission/reception is performed between mobile portable terminal 7 and communication host apparatus 2. In the operation of weather forecasting systems according to Embodiment 1 and Embodiment 2 described above, weather information is transmitted automatically from mobile portable terminal 7 to communication host apparatus 2. In such a case, since information specific to the mobile portable terminal 7 user is transmitted by a method not intended by the user, it is necessary to protect the privacy of the user by preventing leakage of information specific to the user. Also, for the administrator of communication host apparatus 2 providing a weather forecasting service, providing weather information to an indefinite number of users means issuing uncollectible bills to an indefinite number of users, which is undesirable from the standpoint of operating a weather forecasting service. Thus, the kind of authentication functions described below are added when transmission/reception of weather information is performed between mobile portable terminal 7 and communication host apparatus 2.

First, when a mobile portable terminal 7 user performs authentication to use a function that performs weather forecasting between the user and the communication host apparatus 2 administrator, information to the effect that authentication registration has been carried out is stored in first authentication information storage section 725 of mobile portable terminal 7 as described above. When this authentication registration storage is performed, as shown in step S71, information to the effect that authentication registration has been stored is transmitted from mobile portable terminal 7 to communication host apparatus 2, and communication host apparatus 2 stores information to that effect in second authentication information storage section 234 of user information storage section 230. Here, when the user authorizes weather forecast service provision, automatic transmission of information necessary for weather forecasting stored in mobile portable terminal 7 to communication host apparatus 2 is also authorized at the same time. These authorized contents are then able to be transmitted to the user's mobile portable terminal 7.

Figure 10:
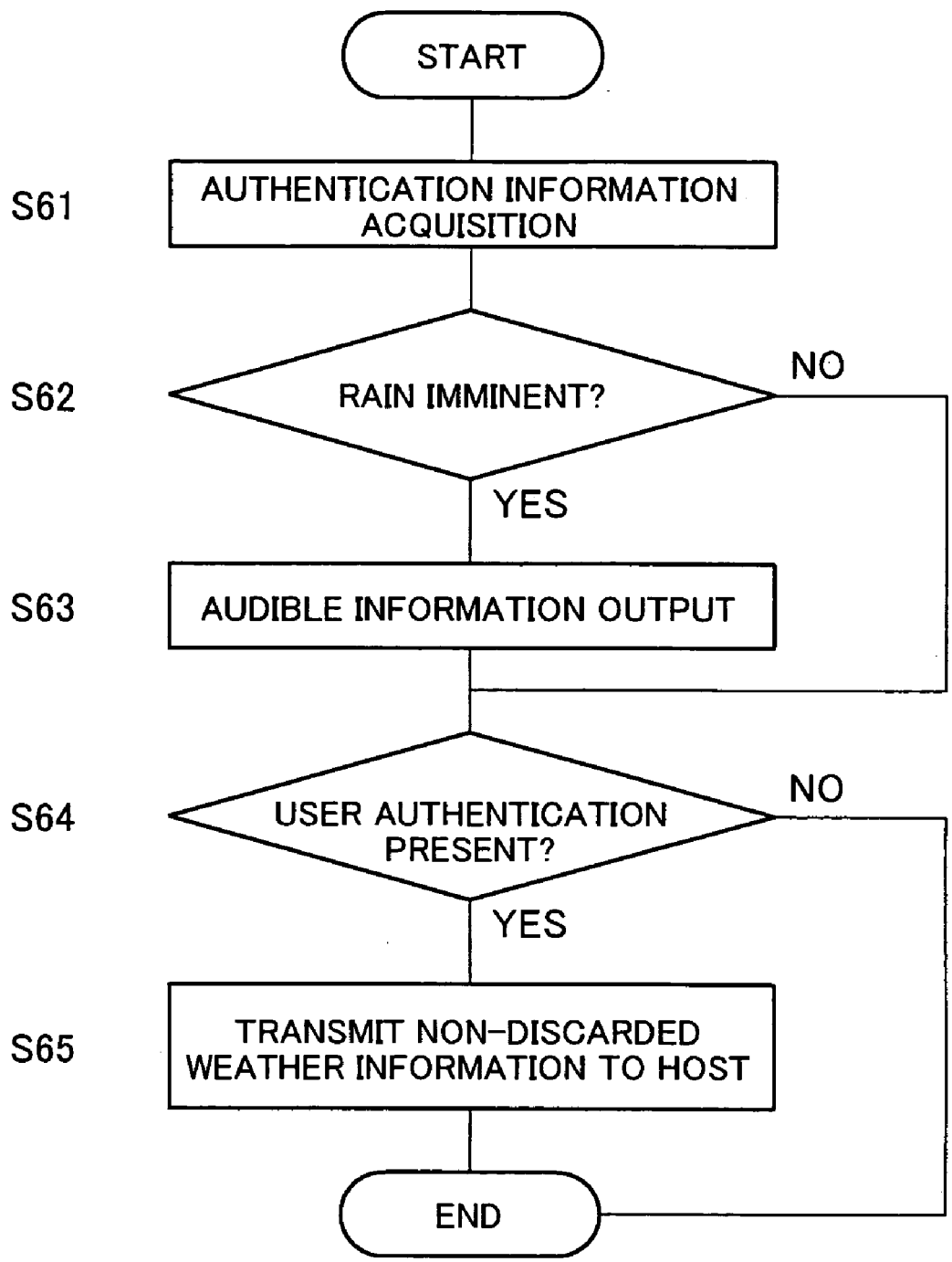
FIG. 10 is a flowchart explaining the operation of the mobile portable terminal shown in FIG. 9.
Figure 11:
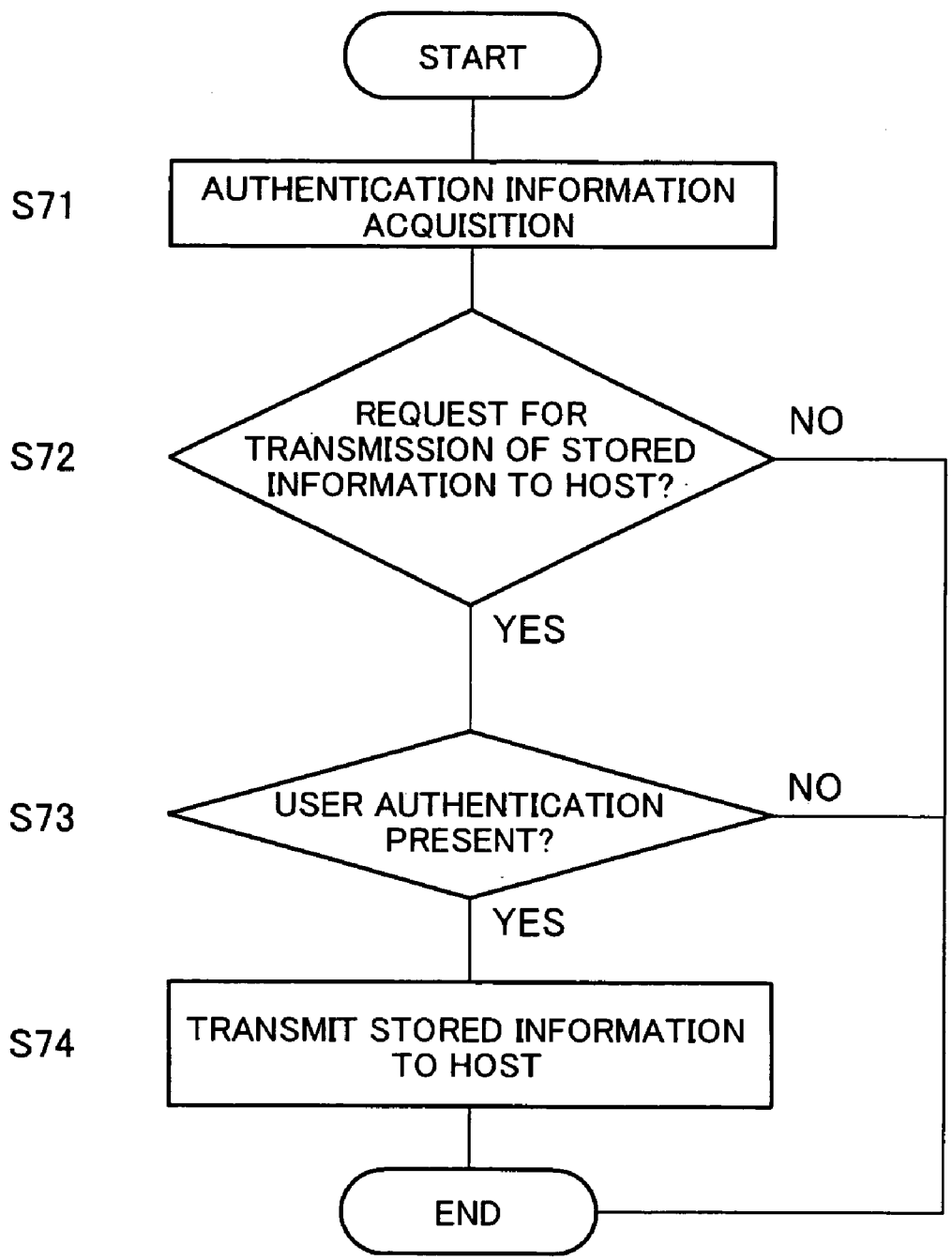
FIG. 11 is a flowchart explaining the operation of a communication host apparatus of a weather forecasting system according to Embodiment 3 of the present invention.

After authentication has been carried out between mobile portable terminal 7 and communication host apparatus 2, it is determined whether or not mobile portable terminal 7 authentication registration has been performed by the user in above-described step S64 shown in FIG. 10, and only if authentication registration has been performed is weather information stored in first forecasting coefficient storage section 724 of mobile portable terminal 7 transmitted to communication host apparatus 2 as shown in step S65.

In communication host apparatus 2, it is determined whether or not there is a transmission request for information stored in communication host apparatus 2 from the user's mobile portable terminal 7 as shown in step S72. Here, information stored in communication host apparatus 2 includes AMEDAS or similar weather forecast information, weather forecast coefficient information, threshold information, and so forth. If there is no information transmission request, this processing ends.

If there is an information transmission request, in communication host apparatus 2 it is determined whether or not user authentication registration is stored in first authentication information storage section 725 as shown in step S73. If authentication registration is not stored, this processing ends.

If authentication registration is stored, information necessary for weather forecasting stored in communication host apparatus 2 is transmitted to the user's mobile portable terminal 7 as shown in step S74. After information necessary function weather forecasting has been transmitted, this processing ends.

In mobile portable terminal 7, weather forecasting is performed based on this transmitted information necessary for weather forecasting.

If user authentication registration is not performed and information necessary for weather forecasting is not transmitted to mobile portable terminal 7, weather forecasting is performed based on initial value information stored in mobile portable terminal 7. A weather forecast based on this initial value information is of lower precision than a weather forecast made based on information necessary for weather forecasting transmitted from communication host apparatus 2.

Thus, according to Embodiment 3, a weather forecast stored in first weather information storage section 723 of internal memory 720 of mobile portable terminal 7 is output as audible information, enabling user convenience to be improved. Furthermore, according to Embodiment 3, a first authentication information storage section 725 is provided in internal memory 720 of mobile portable terminal 7, a hit information storage section 233 is provided in user information storage section 230 of communication host apparatus 2, and transmission/reception of information is not performed only when mutual authentication is not performed between mobile portable terminal 7 and communication host apparatus 2, enabling security functions to be improved.

(Embodiment 4)

For a mobile portable terminal, communication host apparatus, and weather forecasting system according to Embodiment 4 of the present invention, an example is described in which weather forecasting is performed by a mobile portable terminal 7 in the same way as by mobile portable terminals 7 according to Embodiments 1 through 3 described above, and furthermore when weather forecasting is difficult for mobile portable terminal 7, weather forecasting is performed by communication host apparatus 2 and this weather forecast is output to mobile portable terminal 7.

[Configuration of Mobile Portable Terminal]

Figure 12:
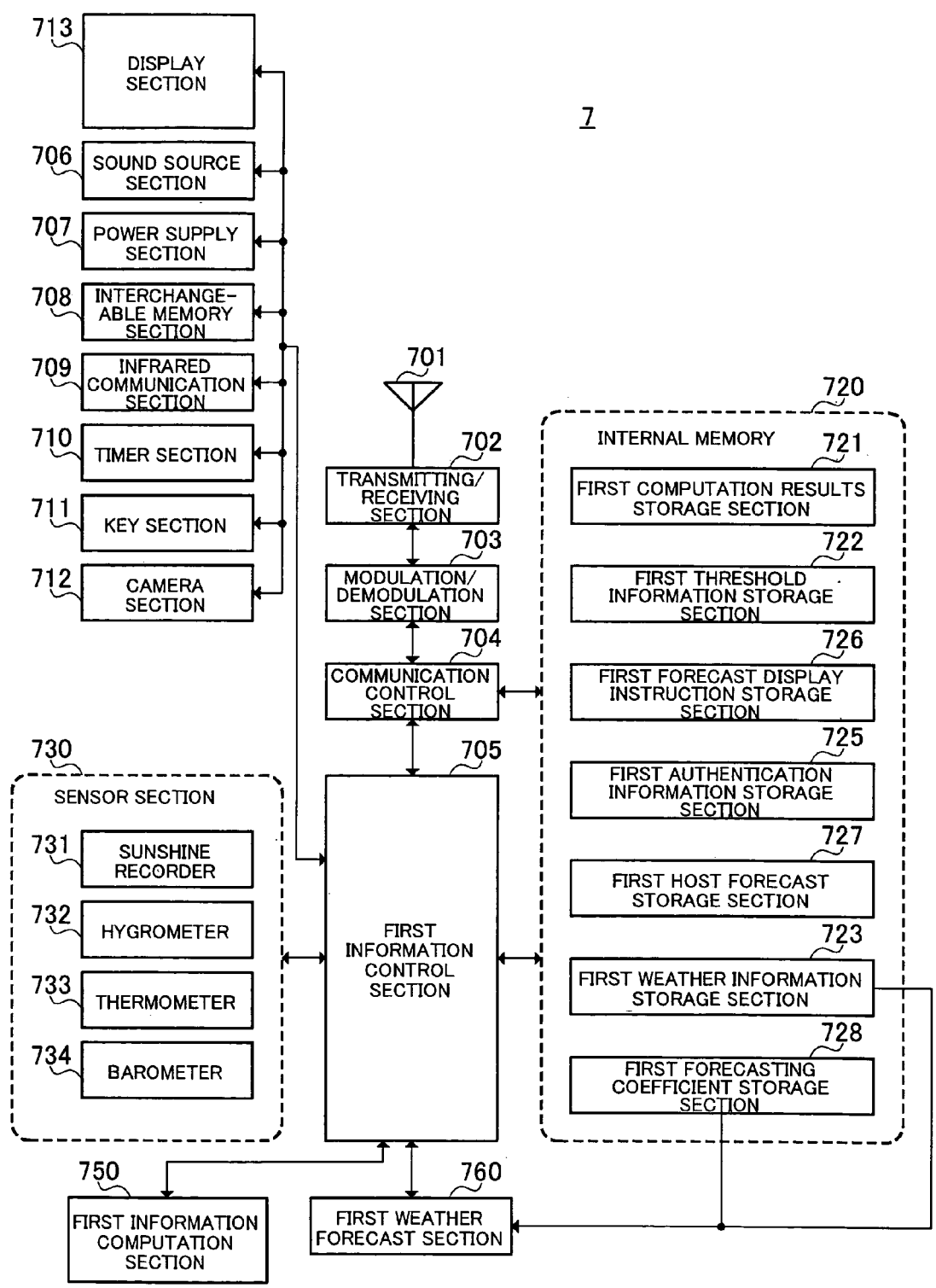
FIG. 12 is a block diagram showing the configuration of a mobile portable terminal of a weather forecasting system according to Embodiment 4 of the present invention.

A mobile portable terminal 7 according to Embodiment 4 basically has a similar configuration to mobile portable terminal 7 according to Embodiment 3, but is further provided with a first forecast display instruction storage section 726 and a first host forecast storage section 727 in internal memory 720 as shown in FIG. 12.

[Configuration of Communication Host Apparatus]

A communication host apparatus 2 according to Embodiment 4 is basically similar to above-described communication host apparatus 2 according to Embodiment 1 shown in FIG. 3. In Embodiment 4, communication host apparatus 2 requires second weather forecast section 213, second forecast display instruction storage section 221 and second host forecast storage section 223 of user transmission information storage section 220, and terminal information storage section 232 of user information storage section 230.

[Operation of Weather Forecasting System]

Figure 13:
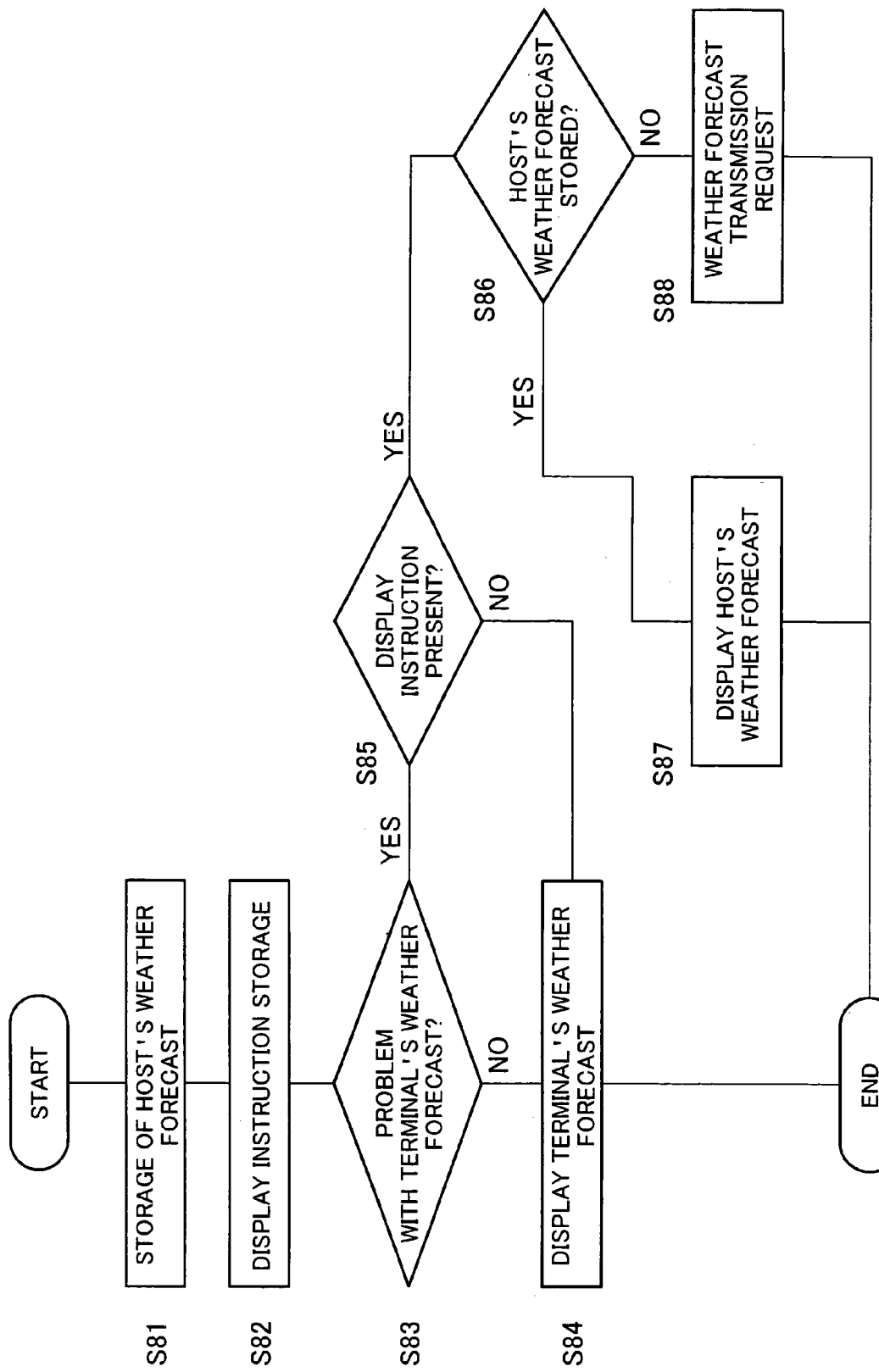
FIG. 13 is a flowchart explaining the operation of the mobile portable terminal shown in FIG. 12.
Figure 14:
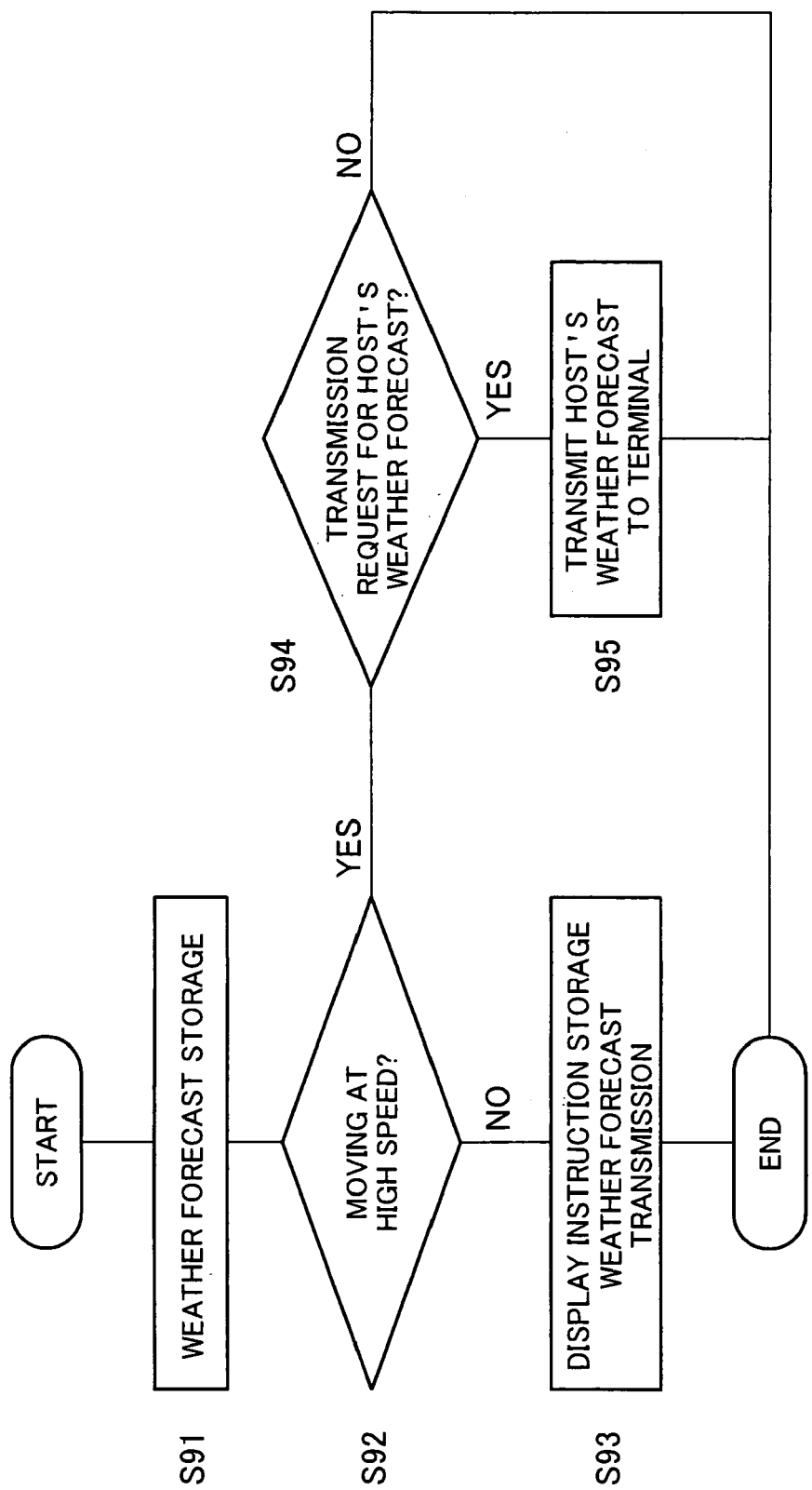
FIG. 14 is a flowchart explaining the operation of a communication host apparatus of a weather forecasting system according to Embodiment 4 of the present invention.

The operation of the weather forecasting system will now be explained, with the operation of mobile portable terminal 7 described using FIG. 13, and the operation of communication host apparatus 2 described using FIG. 14. In the weather forecasting systems 1 according to Embodiment 1 through Embodiment 3 described above, weather forecasting is performed in principle by mobile portable terminal 7 in order to reduce communication time and frequency of communication as much as possible. When mobile portable terminal 7 is moving at high speed and transits plurality of cell ranges 6x and 6y, for example, in a short time, or if a fault occurs in sensor section 730 of mobile portable terminal 7 and accurate weather information measurement cannot be performed, for instance, it is not possible to report a weather forecast to the user accurately. Also, if all weather information must be discarded as a result of sifting of weather information obtained by mobile portable terminal 7 based on threshold information transmitted from communication host apparatus 2, it is impossible for weather forecasting to be executed by mobile portable terminal 7. In a weather forecasting system 1 according to Embodiment 4, weather forecasting can be executed by communication host apparatus 2 if weather forecasting cannot be executed by mobile portable terminal 7.

Operation of Mobile Portable Terminal 7

In the operation of mobile portable terminal 7 according to Embodiment 4, first, as shown in step S81, when a weather forecast stored in second host forecast storage section 223 of user transmission information storage section 220 of communication host apparatus 2 has been transmitted to mobile portable terminal 7 from communication host apparatus 2, this transmitted weather forecast is stored in first host forecast storage section 727 of internal memory 720 of mobile portable terminal 7.

Next, as shown in step S82, when a display instruction for a weather forecast stored in second host forecast storage section 223 of user transmission information storage section 220 of communication host apparatus 2 has been transmitted from communication host apparatus 2 to mobile portable terminal 7, this transmitted display instruction is stored in first host forecast storage section 727 of internal memory 720 of mobile portable terminal 7.

In mobile portable terminal 7, it is determined by first information control section 705 whether or not there is a problem with weather forecasting by mobile portable terminal 7 itself as shown in step S83. If there is no problem with weather forecasting, weather forecasting is executed by first weather forecast section 760 and a weather forecast stored in first weather information storage section 723 is displayed on display section 713, for example, as shown in step S84. After this weather forecast display, this processing ends.

If there is a problem with weather forecasting, it is determined whether or not a display instruction for a weather forecast transmitted from communication host apparatus 2 is stored in first forecast display instruction storage section 726 as shown in step S85. If a display instruction is not stored, a weather forecast stored in first weather information storage section 723 is displayed on display section 713, for example, as shown in step S84. After this weather forecast display, this processing ends.

If a display instruction is stored, it is determined whether or not a weather forecast transmitted from communication host apparatus 2 is stored in first host forecast storage section 727 of internal memory 720 of mobile portable terminal 7 as shown in step S86. If a weather forecast is not stored, a weather forecast transmission request is issued from mobile portable terminal 7 to communication host apparatus 2 as shown in step S88. Here, cases where weather forecasting has not been performed also include a case where a weather forecast for the area in which mobile portable terminal 7 is currently located is not stored, a case where the weather forecast information is old, and so forth. After transmission request output, this processing ends.

When a weather forecast is stored, a weather forecast transmitted from communication host apparatus 2 and stored in first host forecast storage section 727 of internal memory 720 of mobile portable terminal 7 is displayed on display section 713, for example, as shown in step S87. When a weather forecast generated by communication host apparatus 2, rather than a weather forecast generated by mobile portable terminal 7, is displayed on mobile portable terminal 7 in this way, transmission of weather information from mobile portable terminal 7 to communication host apparatus 2 is discontinued in order to reduce communication traffic. After weather forecast display, this processing ends.

In mobile portable terminal 7, if a weather forecast and a weather forecast display instruction are transmitted from communication host apparatus 2, the weather forecast is always stored in first host forecast storage section 727 of internal memory 720, and the display instruction in first forecast display instruction storage section 726.

Operation of Communication Host Apparatus 2

In the operation of communication host apparatus 2, first, as shown in step S91, a weather forecast executed by second weather forecast section 213 based on information constantly stored in communication host apparatus 2 is stored in second weather information storage section 231 of user information storage section 230.

Here, communication host apparatus 2 searches for a fast-moving mobile portable terminal 7 based on terminal information stored in terminal information storage section 232 of user information storage section 230 as shown in step S92. When a fast-moving mobile portable terminal 7 is found, communication host apparatus 2 transmits a weather forecast and a weather forecast display instruction to this fast-moving mobile portable terminal 7 as shown in step S93. After transmission of this weather forecast and display instruction, this processing ends.

On the other hand, in the case of a mobile portable terminal 7 that is not moving at high speed, communication host apparatus 2 determines whether or not there is a transmission request for transmission of a weather forecast and weather forecast display instruction from mobile portable terminal 7 as shown in step S94. If there is no transmission request, this processing ends. If there is a transmission request, communication host apparatus 2 transmits a weather forecast and display instruction to mobile portable terminal 7 as shown in step S95. After transmission of this weather forecast and display instruction, this processing ends.

Thus, according to Embodiment 4, a weather forecast executed by second weather forecast section 213 of communication host apparatus 2 can be displayed on mobile portable terminal 7 based on a weather forecast display instruction from communication host apparatus 2, or based on a judgment by mobile portable terminal 7 itself. Therefore, it is possible for weather forecasting to be executed by mobile portable terminal 7, and also for a weather forecast transmitted from communication host apparatus 2 to be displayed on mobile portable terminal 7 when weather forecasting by mobile portable terminal 7 is difficult.

As described above, according to the present invention, it is possible to provide a mobile portable terminal, communication host apparatus, and weather forecasting system whereby the functional loads of a mobile portable terminal and communication host apparatus can be assigned appropriately, weather forecasting can be performed accurately, and communication traffic can be reduced, and furthermore complex processing in a mobile portable terminal can be decreased, and a user can be provided with a highly convenient weather forecasting service.

That is to say, a mobile portable terminal of the present invention has a configuration including a sensor section that measures weather information comprising any one or a plurality of temperature, humidity, barometric pressure, and/or sunshine, a first weather information storage section that stores the weather information, a first threshold information storage section that stores threshold information used to sift the weather information, a first information computation section that computes necessary weather information from the weather information based on the threshold information, a first weather forecast section that makes a first weather forecast based on the necessary weather information, a communication section that transmits the weather information and receives the threshold information, a weather forecast output section that outputs the first weather forecast, and a first information control section that controls the sensor section, first weather information storage section, first threshold information storage section, first information computation section, first weather forecast section, communication section, and weather forecast output section.

According to this configuration, weather information can be measured by the sensor section, and a first weather forecast can be made by the first weather forecast section based on this weather information. Furthermore, unnecessary weather information can be discarded based on threshold information stored in the first threshold information storage section, a first weather forecast can be executed based on a necessary small amount of weather information, and the first weather forecast can be output to the weather forecast output section, so that the computational processing capability necessary for a first weather forecast can be reduced, and small size and low power consumption can be achieved for a mobile portable terminal capable of executing a first weather forecast by itself. Moreover, minimal weather information is measured by the sensor section, enabling the amount of weather information transmitted by the communication section to be reduced.

A mobile portable terminal of the present invention has a configuration wherein the weather forecast output section is one or both of a display section that outputs the first weather forecast to a user as visible information and/or a sound source section that outputs the first weather forecast to the user as audible/tactile information.

A mobile portable terminal of the present invention has a configuration further including a first forecasting coefficient storage section that stores forecasting coefficients for weighting the weather factors of temperature, humidity, barometric pressure, and sunshine of the weather information, and the first weather forecast is made using those forecasting coefficients.

According to this configuration, a first weather forecast can be made based on forecasting coefficients stored in the first forecasting coefficient storage section, enabling the amount of computational processing for making a first weather forecast to be reduced. Therefore, small size and low power consumption can be achieved for a mobile portable terminal.

A mobile portable terminal of the present invention has a configuration further including a hit information transmitting section that transmits correctness/incorrectness hit information for the first weather forecast using the forecasting coefficients.

According to this configuration, forecasting coefficient precision can be increased based on hit information, enabling first weather forecast precision to be improved.

A mobile portable terminal of the present invention has a configuration further including a first authentication information storage section that stores security related authentication information in weather information transmission or threshold information reception.

According to this configuration, security can be improved in mobile portable terminal information transmission/reception.

A mobile portable terminal of the present invention has a configuration further including a first host forecast storage section that stores information of a second weather forecast generated by a communication host apparatus, and a first forecast display instruction storage section that stores information of a forecast display instruction that causes the second weather forecast to be output by the weather forecast output section.

According to this configuration, when a first weather forecast is difficult for a mobile portable terminal, a second weather forecast stored in the first host forecast storage section is output based on a forecast display instruction stored in the first forecast display instruction storage section.

A communication host apparatus of the present invention has a configuration including an information storage section, a host computer, and a network interface; wherein the information storage section has a second weather information storage section that stores weather information transmitted from a mobile portable terminal, a second threshold information storage section that stores threshold information used to sift the weather information, an extra-terminal weather information database section that stores extra-terminal weather information other than the aforementioned weather information, and a terminal information storage section that stores at least location information of the mobile portable terminal; the host computer has a second information computation section that computes the threshold information based on the weather information and extra-terminal weather information, and a second information control section that controls the second weather information storage section, second threshold information storage section, extra-terminal weather information database section, terminal information storage section, second information computation section, and network interface; and the network interface has a transmission/reception function that at least receives the weather information and transmits the threshold information.

According to this configuration, threshold information can be generated by the second information computation section based on an enormous amount of information comprising weather information stored in the second weather information storage section and transmitted from a mobile portable terminal and extra-terminal weather information stored in the extra-terminal weather information database section, and the majority of heavy computational processing can be performed by this second information computation section. Therefore, the amount of computational processing necessary for a first weather forecast in the mobile portable terminal can be reduced. Furthermore, extra-terminal weather information acquired from an AMEDAS terminal, for example, can be stored in the extra-terminal weather information database section, and threshold information can be generated making supplementary use of this extra-terminal weather information, increasing the precision of threshold information and, as a result, enabling the precision of a first weather forecast by a mobile portable terminal to be improved. Moreover, since extra-terminal weather information can be used, the need to install expensive, high-precision weather information weather sensors in a mobile portable terminal is eliminated, enabling small size and low cost to be achieved for a mobile portable terminal.

A communication host apparatus of the present invention has a configuration further including the aforementioned second information computation section that generates forecasting coefficients for weighting the weather factors of temperature, humidity, barometric pressure, and sunshine of the weather information, and a second forecasting coefficient storage section that stores the forecasting coefficients.

According to this configuration, forecasting coefficients can be generated by the second information computation section, enabling the amount of computational processing of a mobile portable terminal to be reduced.

A communication host apparatus of the present invention has a configuration further including a second authentication information storage section that stores security related authentication information in weather information reception or threshold information transmission.

According to this configuration, security can be improved in communication host apparatus information transmission/reception.

A communication host apparatus of the present invention has a configuration further including a hit information storage section that stores correctness/incorrectness hit information for the first weather forecast transmitted from the mobile portable terminal.

According to this configuration, forecasting coefficient precision can be increased based on first weather forecast hit information stored in the hit information storage section, enabling first weather forecast precision to be improved.

A communication host apparatus of the present invention has a configuration further including a second weather forecast section that makes a second weather forecast based on weather information stored in the second weather information storage section and extra-terminal weather information stored in the extra-terminal weather information database section, a second host forecast storage section that stores the second weather forecast, and a second forecast display instruction storage section that stores information of a forecast display instruction that causes the second weather forecast to be output on the mobile portable terminal.

According to this configuration, a second weather forecast can be output when a first weather forecast is difficult for a mobile portable terminal based on a forecast display instruction stored in the second forecast display instruction storage section and a second weather forecast stored in the second weather forecast section.

A weather forecasting system of the present invention has a configuration including the aforementioned mobile portable terminal and communication host apparatus.

According to this configuration, a weather forecasting system can be provided that enables the above-described effects to be obtained.

Therefore, a mobile portable terminal, communication host apparatus, and weather forecasting system according to the present invention are effective not only for cases where mobile portable terminals are limited to mobile phones, but also for radio communication devices, portable notebook personal computers, Personal Digital Assistants (PDAs), and similar mobile portable terminals, a communication host apparatus that performs transmission and reception of information to and from these mobile portable terminals, and a weather forecasting system that includes mobile portable terminals and a communication host apparatus.

The present invention is not limited to the above-described embodiments, and various variations and modifications may be possible without departing from the scope of the present invention.

This application is based on Japanese Patent Application No. 2004-112165 filed on Apr. 6, 2004, the entire content of which is expressly incorporated by reference herein.

What is claimed is:

1. A mobile portable terminal comprising:
    a sensor section that measures weather information including any one or a plurality of temperature, humidity, barometric pressure, and/or sunshine;
    a first weather information storage section that stores said weather information;
    a first threshold information storage section that stores threshold information used to sift said weather information;
    a first information computation section that computes necessary weather information from said weather information based on said threshold information;
    a first weather forecast section that makes a first weather forecast based on said necessary weather information;
    a communication section that transmits said weather information and receives said threshold information;
    a weather forecast output section that outputs said first weather forecast; and
    a first information control section that controls said sensor section, said first weather information storage section, said first threshold information storage section, said first information computation section, said first weather forecast section, said communication section, and said weather forecast output section.

2. The mobile portable terminal according to claim 1, wherein said weather forecast output section is one or both of a display section that outputs said first weather forecast to a user as visible information and/or a sound source section that outputs said first weather forecast to said user as audible/tactile information.

3. The mobile portable terminal according to claim 1, further comprising a first forecasting coefficient storage section that stores forecasting coefficients for weighting weather factors of temperature, humidity, barometric pressure, and sunshine of said weather information;
    wherein said first weather forecast is made using said forecasting coefficients.

4. The mobile portable terminal according to claim 3, further comprising a hit information transmitting section that transmits correctness/incorrectness hit information for said first weather forecast using said forecasting coefficients.

5. The mobile portable terminal according to claim 3, further comprising a first authentication information storage section that stores security related authentication information in transmission of said weather information or reception of said threshold information.

6. The mobile portable terminal according to claim 5, further comprising:
  a first host forecast storage section that stores information of a second weather forecast generated by a communication host apparatus; and
  a first forecast display instruction storage section that stores information of a forecast display instruction that causes said second weather forecast to be output by said weather forecast output section.

* * * * *